(12) United States Patent
Payyavula et al.

(10) Patent No.: US 12,544,180 B2
(45) Date of Patent: Feb. 10, 2026

(54) MIXED REALITY SYSTEMS AND METHODS FOR INDICATING AN EXTENT OF A FIELD OF VIEW OF AN IMAGING DEVICE

(71) Applicant: Intuitive Surgical Operations, Inc., Sunnyvale, CA (US)

(72) Inventors: Govinda Payyavula, Sunnyvale, CA (US); Cortney Jansen, Sunnyvale, CA (US); Simon P. DiMaio, San Carlos, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 843 days.

(21) Appl. No.: 17/286,774

(22) PCT Filed: Oct. 24, 2019

(86) PCT No.: PCT/US2019/057961
§ 371 (c)(1),
(2) Date: Apr. 19, 2021

(87) PCT Pub. No.: WO2020/086911
PCT Pub. Date: Apr. 30, 2020

(65) Prior Publication Data
US 2021/0338366 A1    Nov. 4, 2021

Related U.S. Application Data

(60) Provisional application No. 62/751,406, filed on Oct. 26, 2018.

(51) Int. Cl.
*H04N 13/344* (2018.01)
*A61B 34/00* (2016.01)
(Continued)

(52) U.S. Cl.
CPC ............ *A61B 90/361* (2016.02); *A61B 34/10* (2016.02); *A61B 34/20* (2016.02); *A61B 34/25* (2016.02);
(Continued)

(58) Field of Classification Search
CPC ........ A61B 2090/365; A61B 2090/502; A61B 2090/3983; A61B 90/361; A61B 34/10;
(Continued)

(56) References Cited

U.S. PATENT DOCUMENTS

| | | |
|---|---|---|
| 4,064,608 A | 12/1977 | Jaeger |
| 6,016,439 A | 1/2000 | Acker |

(Continued)

FOREIGN PATENT DOCUMENTS

| | | |
|---|---|---|
| CA | 2742260 A1 | 5/2010 |
| CA | 2633137 C | 10/2012 |

(Continued)

OTHER PUBLICATIONS

US 9,980,782 B1, 05/2018, Gibby (withdrawn)
(Continued)

*Primary Examiner* — Chante E Harrison

(57) ABSTRACT

A mixed reality presentation system determines a device-specific parameter characterizing an extent of a field of view of an active imaging device. The active imaging device captures imagery of an internal view of a body, and the determining of the device-specific parameter is based on data received from the active imaging device. The mixed reality presentation system also determines a spatial pose of the active imaging device as the active imaging device captures the imagery of the internal view of the body. Based on the device-specific parameter and the spatial pose of the active imaging device, the mixed reality presentation system directs a display device to display a shape overlay indicative (Continued)

of the extent of the field of view relative to the body. The shape overlay is displayed together with an external view of the body in a mixed reality presentation. Corresponding systems and methods are also disclosed.

23 Claims, 15 Drawing Sheets

(51) Int. Cl.
*A61B 34/10* (2016.01)
*A61B 34/20* (2016.01)
*A61B 90/00* (2016.01)
*G06T 19/00* (2011.01)

(52) U.S. Cl.
CPC ......... *G06T 19/006* (2013.01); *H04N 13/344* (2018.05); *A61B 2034/105* (2016.02); *A61B 2034/107* (2016.02); *A61B 2034/252* (2016.02); *A61B 2090/365* (2016.02)

(58) Field of Classification Search
CPC ... A61B 34/20; A61B 34/25; A61B 2034/105; A61B 2034/107; A61B 2034/252; G06T 19/00; G06T 19/006; G06T 11/00; H04N 13/344
See application file for complete search history.

(56) References Cited

U.S. PATENT DOCUMENTS

| | | | |
|---|---|---|---|
| 6,064,904 A | 5/2000 | Yanof et al. | |
| 6,122,455 A | 9/2000 | Hines | |
| 6,591,130 B2* | 7/2003 | Shahidi ................ | A61B 34/20 600/117 |
| 6,645,196 B1 | 11/2003 | Nixon et al. | |
| 6,663,559 B2 | 12/2003 | Hale et al. | |
| 7,232,409 B2 | 6/2007 | Hale et al. | |
| 7,239,330 B2 | 7/2007 | Sauer et al. | |
| 7,774,044 B2 | 8/2010 | Sauer et al. | |
| 7,967,742 B2 | 6/2011 | Hoeg et al. | |
| 8,022,991 B1 | 9/2011 | Kancler et al. | |
| 8,473,031 B2 | 6/2013 | Nixon et al. | |
| 8,864,652 B2 | 10/2014 | Diolaiti et al. | |
| 8,870,750 B2 | 10/2014 | Fehre et al. | |
| 8,911,358 B2 | 12/2014 | Konincks et al. | |
| 9,326,660 B2* | 5/2016 | Akimoto ............... | A61B 1/0005 |
| 9,645,785 B1 | 5/2017 | Hannaford et al. | |
| 9,661,991 B2 | 5/2017 | Glossop | |
| 9,681,925 B2 | 6/2017 | Azar et al. | |
| 9,718,190 B2 | 8/2017 | Larkin et al. | |
| 9,767,608 B2 | 9/2017 | Lee et al. | |
| 9,789,608 B2 | 10/2017 | Itkowitz et al. | |
| 9,818,231 B2 | 11/2017 | Coffey et al. | |
| 9,892,564 B1 | 2/2018 | Cvetko et al. | |
| 9,918,614 B2 | 3/2018 | Ikuma et al. | |
| 9,980,780 B2 | 5/2018 | Lang | |
| 10,008,017 B2 | 6/2018 | Itkowitz et al. | |
| 10,010,379 B1 | 7/2018 | Gibby et al. | |
| 10,130,429 B1 | 11/2018 | Weir | |
| 10,137,575 B2 | 11/2018 | Itkowitz et al. | |
| 10,235,757 B2 | 3/2019 | Hu et al. | |
| 10,579,135 B2 | 3/2020 | Urbach et al. | |
| 10,639,104 B1* | 5/2020 | Barral .................... | A61B 34/20 |
| 10,959,787 B2 | 3/2021 | Isoda et al. | |
| 11,137,874 B2 | 10/2021 | Klein et al. | |
| 11,705,238 B2 | 7/2023 | Sartor et al. | |
| 11,819,284 B2 | 11/2023 | Bianchi et al. | |
| 11,937,880 B2 | 3/2024 | Duindam et al. | |
| 12,008,721 B2 | 6/2024 | Payyavula et al. | |
| 12,059,124 B2* | 8/2024 | Shelton, IV ........... | A61B 90/37 |
| 2003/0076413 A1 | 4/2003 | Kanade et al. | |
| 2005/0187432 A1 | 8/2005 | Hale et al. | |
| 2006/0189842 A1 | 8/2006 | Hoeg et al. | |
| 2006/0281971 A1 | 12/2006 | Sauer et al. | |
| 2007/0021738 A1 | 1/2007 | Hasser et al. | |
| 2007/0236514 A1 | 10/2007 | Agusanto et al. | |
| 2008/0065109 A1 | 3/2008 | Larkin | |
| 2008/0071292 A1 | 3/2008 | Rich | |
| 2010/0076305 A1 | 3/2010 | Maier-Hein et al. | |
| 2011/0034798 A1 | 2/2011 | Payner | |
| 2013/0018254 A1 | 1/2013 | Drucker | |
| 2013/0038707 A1 | 2/2013 | Cunningham et al. | |
| 2013/0165948 A1 | 6/2013 | Popovic | |
| 2013/0222364 A1 | 8/2013 | Kraus et al. | |
| 2013/0250081 A1 | 9/2013 | Pandey | |
| 2014/0078138 A1 | 3/2014 | Martin et al. | |
| 2015/0202022 A1 | 7/2015 | Branch et al. | |
| 2015/0366628 A1 | 12/2015 | Ingmanson | |
| 2016/0000515 A1 | 1/2016 | Sela et al. | |
| 2016/0015469 A1* | 1/2016 | Goshayesh ............... | G06T 7/11 600/424 |
| 2016/0191887 A1 | 6/2016 | Casas | |
| 2016/0235486 A1 | 8/2016 | Larkin | |
| 2016/0287337 A1 | 10/2016 | Aram et al. | |
| 2017/0056115 A1 | 3/2017 | Corndorf et al. | |
| 2017/0099479 A1 | 4/2017 | Browd et al. | |
| 2017/0128041 A1 | 5/2017 | Hasser et al. | |
| 2017/0128144 A1 | 5/2017 | Hasser et al. | |
| 2017/0128145 A1 | 5/2017 | Hasser et al. | |
| 2017/0135775 A1 | 5/2017 | Cunningham et al. | |
| 2017/0172662 A1 | 6/2017 | Panescu et al. | |
| 2017/0172696 A1 | 6/2017 | Saget et al. | |
| 2017/0209232 A1 | 7/2017 | Larkin et al. | |
| 2017/0210012 A1 | 7/2017 | Larkin et al. | |
| 2017/0213387 A1 | 7/2017 | Bean et al. | |
| 2017/0305016 A1 | 10/2017 | Larkin et al. | |
| 2017/0344674 A1 | 11/2017 | Mccloskey et al. | |
| 2017/0348061 A1 | 12/2017 | Joshi et al. | |
| 2018/0032130 A1 | 2/2018 | Meglan | |
| 2018/0116732 A1 | 5/2018 | Lin et al. | |
| 2018/0140362 A1 | 5/2018 | Cali et al. | |
| 2018/0271603 A1 | 9/2018 | Nir et al. | |
| 2018/0286135 A1 | 10/2018 | Jagga et al. | |
| 2018/0318009 A1 | 11/2018 | Sohlden et al. | |
| 2018/0332422 A1 | 11/2018 | Edry et al. | |
| 2019/0008595 A1 | 1/2019 | Popovic et al. | |
| 2019/0088162 A1 | 3/2019 | Meglan | |
| 2019/0156402 A1 | 5/2019 | Greenberger et al. | |
| 2019/0183576 A1 | 6/2019 | Fahim et al. | |
| 2019/0231453 A1 | 8/2019 | Carnes et al. | |
| 2019/0380792 A1* | 12/2019 | Poltaretskyi .......... | G06F 3/0482 |
| 2020/0015904 A1 | 1/2020 | Scheib et al. | |
| 2020/0054412 A1 | 2/2020 | Fuerst et al. | |
| 2020/0078103 A1 | 3/2020 | Duindam et al. | |
| 2020/0132490 A1 | 4/2020 | Yu | |
| 2020/0196863 A1 | 6/2020 | Anderson et al. | |
| 2020/0388075 A1* | 12/2020 | Kazanzides ........... | A61B 90/37 |
| 2021/0150704 A1 | 5/2021 | Bruening et al. | |
| 2021/0228282 A1 | 7/2021 | Dimaio et al. | |
| 2021/0343088 A1* | 11/2021 | Payyavula ......... | A61B 1/00045 |
| 2022/0117662 A1* | 4/2022 | Babb ..................... | A61B 34/10 |
| 2022/0175473 A1 | 6/2022 | Feather et al. | |
| 2022/0192776 A1* | 6/2022 | Gibby ............. | A61B 1/000094 |
| 2022/0383588 A1 | 12/2022 | Dos Santos Raposo et al. | |
| 2023/0126545 A1 | 4/2023 | Liu et al. | |
| 2023/0139425 A1 | 5/2023 | Shademan et al. | |
| 2023/0293259 A1* | 9/2023 | Lomeli ................... | A61B 90/36 600/424 |
| 2023/0380913 A1* | 11/2023 | Ida ....................... | A61B 34/37 |
| 2024/0282065 A1 | 8/2024 | Payyavula et al. | |

FOREIGN PATENT DOCUMENTS

| | | | | |
|---|---|---|---|---|
| CA | 2808757 A1 * | 9/2013 | ......... | A61B 1/00009 |
| CA | 2927381 C | 7/2018 | | |
| CN | 101193603 A | 6/2008 | | |
| CN | 102448680 A | 5/2012 | | |
| CN | 109288591 B * | 12/2021 | ............ | A61B 34/20 |
| CN | 109419524 B * | 11/2022 | .......... | A61B 5/0077 |
| EP | 1294285 A1 | 3/2003 | | |
| EP | 2289452 A2 | 3/2011 | | |
| EP | 2289453 A2 | 3/2011 | | |

(56) References Cited

FOREIGN PATENT DOCUMENTS

| | | | | |
|---|---|---|---|---|
| EP | 2289454 | A2 | 3/2011 | |
| EP | 2046538 | B1 | 12/2011 | |
| EP | 1887961 | B1 | 1/2012 | |
| EP | 2414137 | A2 | 2/2012 | |
| EP | 2471484 | A2 | 7/2012 | |
| EP | 2554104 | B1 | 7/2018 | |
| EP | 3395282 | A1 * | 10/2018 | ............ A61B 17/24 |
| JP | 2009542362 | A | 12/2009 | |
| JP | 2012050887 | A | 3/2012 | |
| JP | 2012050888 | A | 3/2012 | |
| JP | 2012055717 | A | 3/2012 | |
| JP | 4999012 | B2 | 8/2012 | |
| JP | 2012518453 | A | 8/2012 | |
| JP | 2012521855 | A | 9/2012 | |
| JP | 2012213655 | A | 11/2012 | |
| JP | 2013188574 | A | 9/2013 | |
| JP | 2013252452 | A | 12/2013 | |
| JP | 2014138901 | A | 7/2014 | |
| JP | 2016052521 | A | 4/2016 | |
| JP | 2016064155 | A | 4/2016 | |
| JP | 2016101506 | | 6/2016 | |
| JP | 2017529116 | A | 10/2017 | |
| JP | 2023026382 | A * | 2/2023 | ........... A61B 1/0005 |
| KR | 20080027224 | A | 3/2008 | |
| KR | 20090034813 | A | 4/2009 | |
| KR | 20120004479 | A | 1/2012 | |
| WO | WO-0197694 | A1 | 12/2001 | |
| WO | WO-2007030173 | A1 | 3/2007 | |
| WO | WO-2008002830 | A2 | 1/2008 | |
| WO | WO-2010097719 | A1 | 9/2010 | |
| WO | WO-2010117684 | A1 | 10/2010 | |
| WO | WO-2010117685 | A2 | 10/2010 | |
| WO | WO-2011122032 | A1 * | 10/2011 | ......... A61B 1/00009 |
| WO | WO-2016007595 | A1 | 1/2016 | |
| WO | WO-2016162789 | A3 | 11/2016 | |
| WO | WO-2016207628 | A1 | 12/2016 | |
| WO | WO-2017114834 | A1 | 7/2017 | |
| WO | WO-2017151752 | A1 | 9/2017 | |
| WO | WO-2017151999 | A1 | 9/2017 | |
| WO | WO-2018005842 | A1 | 1/2018 | |
| WO | WO-2018032083 | A1 | 2/2018 | |
| WO | WO-2018052966 | A1 | 3/2018 | |
| WO | WO-2018118411 | A1 | 6/2018 | |
| WO | WO-2018175094 | A1 | 9/2018 | |
| WO | WO-2018195216 | A1 | 10/2018 | |
| WO | WO-2018213489 | A1 * | 11/2018 | ............ A61B 90/11 |
| WO | WO-2020198302 | A1 | 10/2020 | |
| WO | WO-2024145414 | A1 | 7/2024 | |

OTHER PUBLICATIONS

Extended European Search Report for Application No. EP22166192.9, mailed on Jun. 28, 2022, 9 pages.

International Preliminary Report on Patentability for Application No. PCT/US2019/057961, mailed on May 6, 2021, 08 pages.

International Preliminary Report on Patentability for Application No. PCT/US2019/057962, mailed on May 6, 2021, 07 pages.

Carbone M. et al., "Proof of Concept: Wearable Augmented Reality Video SeeThrough Display for Neuro-Endoscopy", International Conference on Financial Cryptography and Data Security, Jul. 14, 2018, pp. 95-104.

Hedayati H., et al., "Improving Collocated Robot Teleoperation with Augmented Reality," Human-Robot Interaction, ACM, Feb. 26, 2018, pp. 78-86.

International Search Report and Written Opinion for Application No. PCT/US2019/057962, mailed on Jan. 24, 2020, 9 pages.

International Search Report and Written Opinion for Application No. PCT/US2019/057961, mailed on Feb. 7, 2020, 10 pages.

Qian L., et al., "ARssist: augmented reality on a head-mounted display for the first assistant in robotic surgery," Healthcare Technology Letters, Sep. 2018, vol. 5 (5), pp. 194-200.

Trevisan D.G., et al., "Augmented Vision for Medical Applications," Proceedings ACM SAC, Mar. 16, 2008, pp. 415-1419.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Extended European Search Report for Application No. EP23208156.2, mailed on Apr. 10, 2024, 09 pages.

International Preliminary report on patentability for Application No. PCT/2020/015653, mailed Aug. 12, 2021, 9 pages.

International Search Report and Written Opinion for Application No. PCT/2020/015653, mailed Apr. 30, 2020, 13 pages.

* cited by examiner

MIXED REALITY SYSTEMS AND METHODS FOR INDICATING AN EXTENT OF A FIELD OF VIEW OF AN IMAGING DEVICE

RELATED APPLICATIONS

The present application is a U.S. National Stage Application under 35 U.S.C. § 371 of International Application No. PCT/US19/57961, filed on Oct. 24, 2019, and entitled "MIXED REALITY SYSTEMS AND METHODS FOR INDICATING AN EXTENT OF A FIELD OF VIEW OF AN IMAGING DEVICE," which claims priority to U.S. Provisional Patent Application No. 62/751,406, filed on Oct. 26, 2018, and entitled "MIXED REALITY SYSTEMS AND METHODS FOR INDICATING AN EXTENT OF A FIELD OF VIEW OF AN IMAGING DEVICE," the contents of which are hereby incorporated by reference in their entirety.

BACKGROUND INFORMATION

During an operation being performed within a partially or wholly confined space, an imaging device may capture and provide an internal view of the confined space. For example, a minimally invasive medical procedure such as a diagnostic or surgical procedure using a computer-assisted medical system may be performed to operate on tissue inside a body of a patient, and an imaging device such as an endoscope may be used during the operation to capture and provide an internal view of the body.

In some examples, it may be desirable for a person involved in performing the operation (e.g., an assistant who is assisting with the procedure) to perform actions associated with the confined space and/or parts of the confined space depicted by the internal view provided by the imaging device. For instance, if the operation is a medical procedure such as a minimally invasive surgical procedure, it may be desirable during the operation for an assistant to insert instruments, supplies, or the like into the confined space in such a way that the inserted objects can be readily seen and easily used by a clinician looking at the internal view provided by the imaging device.

The imaging device capturing the internal view of the partially or wholly confined space may be at least partially hidden from view from the perspective of the person attempting to perform the actions associated with the confined space. As such, in order to effectively perform the desired actions, the person typically has to mentally visualize the location and orientation of the imaging device and its field of view.

SUMMARY

Mixed reality systems and methods for indicating an extent of a field of view of an imaging device are described herein. For instance, one embodiment is implemented as a system comprising a memory storing instructions and a processor communicatively coupled to the memory and configured to execute the instructions. For example, the instructions may direct the processor to determine, based on data received from an active imaging device configured to capture imagery of an internal view of a body, a device-specific parameter characterizing an extent of a field of view of the active imaging device. The instructions may also direct the processor to determine a spatial pose of the active imaging device as the active imaging device captures the imagery of the internal view of the body. Based on the device-specific parameter and the spatial pose of the active imaging device, the instructions may cause the processor to direct a display device to display, together with an external view of the body, a shape overlay indicative of the extent of the field of view relative to the body.

Another exemplary embodiment is implemented as a method performed by a mixed reality presentation system. For example, the method includes determining, based on data received from an active imaging device configured to capture imagery of an internal view of a body, a device-specific parameter characterizing an extent of a field of view of the active imaging device. The method further includes determining a spatial pose of the active imaging device as the active imaging device captures the imagery of the internal view of the body. Additionally, the method includes directing, based on the device-specific parameter and the spatial pose of the active imaging device, a display device to display, together with an external view of the body, a shape overlay indicative of the extent of the field of view relative to the body.

Another exemplary embodiment is implemented by a non-transitory, computer-readable medium storing instructions that, when executed, direct a processor of a computing device to perform operations described herein. For example, the instructions may direct the processor to determine, based on data received from an active imaging device configured to capture imagery of an internal view of a body, a device-specific parameter characterizing an extent of a field of view of the active imaging device. The instructions may also direct the processor to determine a spatial pose of the active imaging device as the active imaging device captures the imagery of the internal view of the body. Additionally, based on the device-specific parameter and the spatial pose of the active imaging device, the instructions may cause the processor to direct a display device to display, together with an external view of the body, a shape overlay indicative of the extent of the field of view relative to the body.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
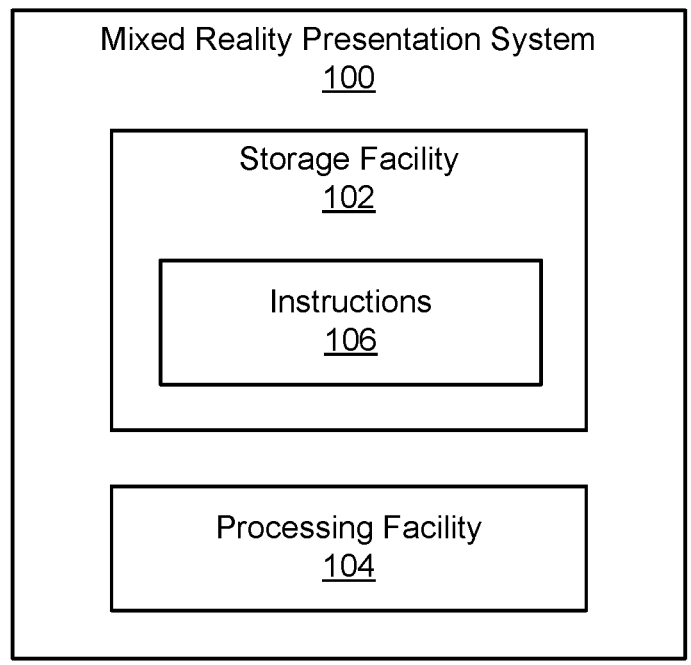
FIG. 1 illustrates an exemplary mixed reality presentation system for indicating an extent of a field of view of an imaging device according to principles described herein.

Mixed reality presentation systems and methods for indicating an extent of a field of view of an imaging device are described herein. For example, in order to facilitate a performance of an operation within a partially or wholly confined space, systems and methods disclosed herein use mixed reality technology to display a shape overlay together with a real external view. Examples of an operation within a partially or wholly confined space include medical procedures such as minimally invasive surgical or non-surgical medical procedures performed with artificial or natural orifices. Examples of shape overlays include graphics depicting, possibly among other virtual objects, virtual geometric shapes such as three-dimensional ("3D") frustum or other shapes. As used herein, mixed reality technology may refer to any technology providing an immersive reality that combines real and virtual elements (e.g., augmented reality technology, augmented virtuality technology, etc.). Thus, in this way, a user of the mixed reality systems and methods described herein may quickly and easily understand an extent (e.g., a shape, a location, an orientation, etc.) of a field of view of an imaging device capturing imagery of an operational area that is not viewable from the user's perspective. As such, the user may avoid having to mentally visualize part or the entirety of the field of view when performing actions for which a static or dynamic understanding of the field of view extent may be useful.

Aspects of the mixed reality presentation systems and methods described herein primarily relate to implementations employing a computer-aided medical system such as a minimally invasive surgical system. As will be described in more detail below, however, it will be understood that inventive aspects disclosed herein may be embodied and implemented in various ways, including by employing robotic and non-robotic embodiments and implementations. Implementations relating to surgical or other medical systems are merely exemplary and are not to be considered as limiting the scope of the inventive aspects disclosed herein. For example, any reference to surgical instruments, surgical techniques, and/or other such details relating to a surgical context will be understood to be non-limiting as the instruments, systems, and methods described herein may be used for medical treatment or diagnosis, cosmetic improvements, imaging of human or animal anatomy, gathering data from human or animal anatomy, setting up or taking down systems, training medical or non-medical personnel, and so forth (any of which may or may not also involve surgical aspects). In other examples, the instruments, systems, and methods described herein may also be used for procedures performed on, or with, animals, human cadavers, animal cadavers, portions of human or animal anatomy, tissue removed from human or animal anatomies (which may or may not be re-implanted within the human or animal anatomy), non-tissue work pieces, training models, etc. In yet other examples, the instruments, systems, and methods described herein may be applied for non-medical purposes including for industrial systems, general robotics, teleoperational systems, and/or sensing or manipulating non-tissue work pieces.

As one exemplary implementation, a mixed reality presentation system may include or be implemented by a memory storing instructions and a processor communicatively coupled to the memory and configured to execute the instructions to perform functionality associated with indicating the extent of the field of view of the imaging device.

For example, the mixed reality presentation system may determine a device-specific parameter characterizing an extent of a field of view of the active imaging device. For instance, the device-specific parameter may be determined based on data received from an active imaging device that is configured to capture imagery of an internal view of a body (e.g., a body of a live patient or another suitable body that may be living or non-living, biological or non-biological, natural or artificial, etc.). The active imaging device may be an imaging device that is being used or prepared for use to actively capture imagery of the internal view of the body during an ongoing or imminent operation. Accordingly, as will be described in more detail below, the device-specific parameter may include any suitable data specifically describing the active imaging device individually and/or as part of a class of like imaging devices (e.g., a class of imaging devices of the same make, model, technology type, etc.).

Along with determining the device-specific parameter, the mixed reality presentation system may further determine a spatial pose of the active imaging device as the active imaging device captures the imagery of the internal view of the body. While the device-specific parameter may characterize attributes of the field of view such as a shape, a size (e.g., a width, etc.), and/or other such attributes, the spatial pose of the active imaging device may correspond to a spatial position, a spatial orientation, a viewing angle, and/or other such dynamic characteristics of the field of view as the active imaging device captures imagery of the internal view. Accordingly, as used herein, an extent of the field of view may refer to both shape and size-type attributes of the field of view as well as to dynamic pose-type attributes (e.g., location, orientation, angle, etc.) of the field of view.

Based on both the device-specific parameter and the spatial pose of the active imaging device, the mixed reality presentation system may direct a display device (e.g., a mixed reality headset device worn by a user, a display monitor not worn by the user, etc.) to display, together with an external view of the body, a shape overlay indicative of the extent of the field of view relative to the body. For example, the external view may be a photographic representation from a vantage point of a user (e.g., a representation captured using a camera integrated into the display device) or a direct view that the user has from the vantage point (e.g., through a partially transparent screen of the display device). The shape overlay may be presented together with (e.g., overlapping with, integrated with, overlaid onto, etc.) the external view as a virtual object integrated with real objects in a mixed reality presentation to the user. Accordingly, the user may instantly and conveniently see and understand the extent of the field of view of the active imaging device even though at least part of the active imaging device (e.g., a distal end of the imaging device capturing the internal view) is not visible to the user within the external view.

Various benefits may be provided by the mixed reality presentation systems and methods described herein. For example, as mentioned above, challenging operations performed in partially or entirely confined spaces (e.g., minimally invasive medical procedures performed within training models, cadavers, bodies of animals or humans, etc.) may be facilitated and made more effective and efficient when persons performing the operations can easily and dynamically see and understand an extent of a field of view of the active imaging device.

In certain implementations, for instance, an assistant who is helping to perform a procedure may be tasked with inserting an instrument or other object (e.g., supplies such as patching materials, suturing materials, etc.) into an operational area within a body. The assistant may perform this task easily, timely, and effectively if the assistant can see the extent of a field of view of an active imaging device providing an internal view to the operator. For example, a shape overlay indicative of (e.g., graphically illustrating) the extent of the field of view may be integrated or otherwise presented together with an external view the assistant has of the body (e.g., by way of a mixed reality headset device, a mixed-reality-enabled display monitor device, etc.). In some cases, the assistant may perform the task more easily, timely, and effectively if the shape overlay is presented to augment the assistant's understanding of the internal geometry of the operational area than if the assistant has to mentally visualize the internal geometry without the aid of the mixed reality presentation.

Moreover, the mixed reality systems and methods described herein are beneficial in certain implementations not only for indicating a general spatial pose of a field of view of an active imaging device, but also for indicating an accurate, real-time extent of the field of view that is customized based on one or more device-specific parameters associated with the active imaging device, and that further indicates the device-specific shape and size of the field of view. This may enable a variety of different models and/or types of imaging devices to be dynamically supported and used by a system (e.g., a medical system such as a surgical system), to be switched between during the operation, and so forth.

Various embodiments will now be described in more detail with reference to the figures. The systems and methods described herein may provide one or more of the benefits mentioned above as well as various additional and/or alternative benefits that will be made apparent by the description below.

FIG. 1 illustrates an exemplary mixed reality presentation system 100 ("system 100"). As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

Storage facility 102 may maintain (e.g., store) executable data used by processing facility 104 to perform any of the functionality described herein. For example, storage facility 102 may store instructions 106 that may be executed by processing facility 104 to perform any of the functionality described herein. Instructions 106 may be implemented by any suitable application, software, code, and/or other executable data instance. Storage facility 102 may also maintain any data received, generated, managed, used, and/or transmitted by processing facility 104.

Processing facility 104 may be configured to perform (e.g., execute instructions 106 stored in storage facility 102 to perform) various processing functions associated with indicating an extent of a field of view of an imaging device. For example, processing facility 104 may determine, based on data received from an active imaging device configured to capture imagery of an internal view of a body, a device-specific parameter characterizing an extent of a field of view of the active imaging device.

Processing facility 104 may also determine a spatial pose of the active imaging device as the active imaging device captures the imagery of the internal view of the body. For example, as will be described in more detail below, processing facility 104 may determine the spatial pose of the active imaging device based on kinematic or visual data (e.g., marker tracking, etc.) that indicates the spatial pose of the imaging device with respect to known points in space such as where the body is located, where various components of a system that interacts with the body are located, or the like. Based on the device-specific parameter and the spatial pose of the active imaging device, processing facility 104 may direct a display device to display, together with an external view of the body, a shape overlay indicative of the extent of the field of view relative to the body. These and other functions that may be performed by processing facility 104 will be described in more detail below.

In some implementations, system 100 (e.g., processing facility 104) may be configured to indicate an extent of a field of view of an imaging device in real time. As used herein, a function may be said to be performed in real time when the function relates to or is based on dynamic, time-sensitive information and the function is performed while the time-sensitive information remains accurate or otherwise relevant. Due to processing times, communication latency, and other inherent delays in physical systems, certain functions may be considered to be performed in real time when performed immediately and without undue delay, even if performed after small delay (e.g., a delay up to a few seconds or the like). As one example of real-time functionality, a spatial pose of an active imaging device may dynamically change as the active imaging device captures the imagery of the internal view of the body, so the determination of the spatial pose may be performed in real time by tracking (i.e., immediately and repeatedly determining) the spatial pose. Example techniques usable for tracking the spatial pose include using kinematic information obtained from a fixture or a manipulator arm holding the imaging device, using image data depicting external portion(s) of the imaging device outside of the body combined with knowledge of the geometry of the imaging device, a combination of the foregoing, etc. In turn, a display device may be directed to display a shape overlay (e.g., a shape overlay indicative of the extent of the field of view and based on the spatial pose and the device-specific parameter) in real time by updating, within a mixed reality presentation displayed on the display device, the shape overlay in relation to the external view of the body.

System 100 may be used in various contexts with various different types of technologies as may serve a particular implementation. For example, system 100 may be effectively used in a medical context such as a computer-assisted medical procedure in which an operation is performed inside of any suitable type of body as may serve a particular implementation. For instance, the medical procedure may be performed within a body of a live human patient, within a body of a cadaver being used for training purposes, within a body of a non-human subject (e.g., an animal or the like), or any other suitable biological body. In some examples, the body within which the operation is performed may be only an anatomical portion of one of these other types of bodies. For example, the body within which the operation is performed may be a disembodied organ or other body part taken from a full biological body (e.g., to be used for training purposes), or may be an artificial training fixture (e.g., an artificial organ or other body part) used for training, experimental, and/or other such purposes.

In other implementations, system 100 may be used in medical contexts where imaging devices or tools are not controlled by computer-assistance (e.g., laparoscopic procedures that do not involve robotic or computer-assisted control of system components), or that are not surgical in nature (e.g., diagnostic or exploratory imaging without surgical elements), or that are not for treatment or diagnosis (e.g., training or other procedures where such procedures do not involve treatment). Additionally, in certain implementations, system 100 may be used in non-medical contexts. For instance, system 100 may be useful for performing inspection or repair operations within bodies of complex electrical or mechanical systems such engines and other complex systems. As another example, system 100 may be used in law enforcement or surveillance contexts (e.g., to inspect and disable dangerous explosive devices, to conduct surveillance in tight spaces, etc.), and/or in any other contexts or with any other technologies as may serve a particular implementation.

One exemplary context in which system 100 may be used will now be described. Specifically, system 100 may operate as part of or in conjunction with a computer-assisted medical system. The exemplary computer-assisted medical system described below is illustrative and not limiting. It will be understood that mixed reality systems and methods described herein may operate as part of or in conjunction with the computer-assisted medical system described herein, with other suitable computer-assisted medical systems that may or may not be surgical systems, and/or with other suitable medical and/or non-medical systems as may serve a particular implementation.

Figure 2:
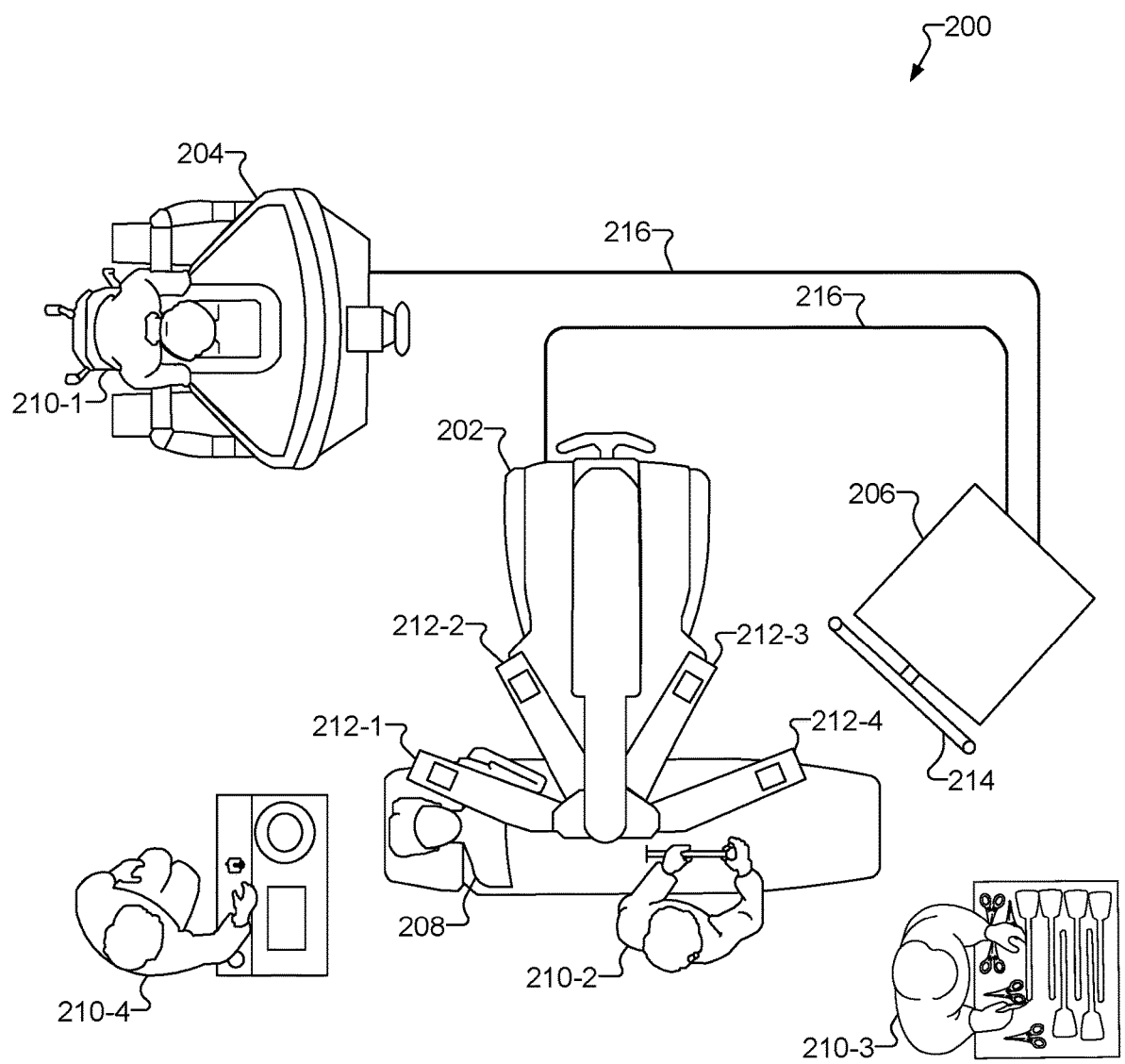
FIG. 2 illustrates an exemplary computer-assisted medical system according to principles described herein.

FIG. 2 illustrates an exemplary computer-assisted medical system 200 ("medical system 200") that may be used to perform surgical and/or non-surgical medical procedures. As shown, medical system 200 may include a manipulating system 202, a user control system 204, and an auxiliary system 206 communicatively coupled one to another. Medical system 200 may be utilized by a medical team to perform a computer-assisted medical procedure or other such operation on a body of a patient 208 or any other body as may serve a particular implementation. As shown, the medical team may include a first clinician 210-1 (such as a surgeon for a surgical procedure), an assistant 210-2, a nurse 210-3, and a second clinician 210-4 (such as an anesthesiologist for a surgical procedure), all of whom may be collectively referred to as "team members 210," and each of whom may control, interact with, or otherwise be a user of medical system 200. Additional, fewer, or alternative team members may be present during a medical procedure as may serve a particular implementation. For example, for some medical procedures, the "clinician 210-1" may not be a medical doctor. Further, team composition for non-medical procedures generally differ, and include other combinations of members serving non-medical roles.

While FIG. 2 illustrates an ongoing minimally invasive medical procedure such as a minimally invasive surgical procedure, it will be understood that medical system 200 may similarly be used to perform open medical procedures or other types of operations that may similarly benefit from the accuracy and convenience of medical system 200. For example, operations such as exploratory imaging operations, mock medical procedures used for training purposes, and/or other operations may also be performed using medical system 200. Additionally, it will be understood that any medical procedure or other operation for which medical system 200 is employed may not only include an operative phase, but may also include preoperative, postoperative, and/or other such operative phases.

As shown in FIG. 2, manipulating system 202 may include a plurality of manipulator arms 212 (e.g., manipulator arms 212-1 through 212-4) to which a plurality of instruments (e.g., surgical instruments, other medical instruments, or other instruments, etc.) may be coupled. Each instrument may be implemented by any suitable surgical tool (e.g., a tool having tissue-interaction functions), medical tool, imaging device (e.g., an endoscope), sensing instrument (e.g., a force-sensing instrument), diagnostic instrument, or the like that may be used for a computer-assisted medical procedure such as a surgical procedure on patient 208 (e.g., by being at least partially inserted into patient 208 and manipulated to perform a computer-assisted medical procedure on patient 208). While manipulating system 202 is depicted and described herein as including four manipulator arms 212, it will be recognized that manipulating system 202 may include only a single manipulator arm 212 or any other number of manipulator arms as may serve a particular implementation. Additionally, it will be understood that, in some exemplary systems, certain instruments may not be coupled to or controlled by manipulator arms, but rather may be handheld and controlled manually (e.g., by a surgeon, other clinician, or other medical personnel). For instance, certain handheld devices of this type may be used in conjunction with or as an alternative to computer-assisted instrumentation that is coupled to manipulator arms 212 shown in FIG. 2 and is described in various examples herein.

Manipulator arms 212 and/or instruments attached to manipulator arms 212 may include one or more displacement transducers, orientational sensors, and/or positional sensors used to generate raw (i.e., uncorrected) kinematics information. One or more components of medical system 200 may be configured to use the kinematics information to track (e.g., determine positions of) and/or control the instruments.

Instruments attached to manipulator arms 212 may each be positioned at an operational area associated with patient 208. As used herein, an "operational area" associated with a body (e.g., a body of patient 208 or another type of body being operated upon such as described above) may, in certain examples, be entirely disposed within the body and may include an area within the body near where an operation (e.g., a medical procedure) is planned to be performed, is being performed, or has been performed. For example, for a minimally invasive medical procedure being performed on tissue internal to a patient, the operational area may include the tissue, anatomy underlying the tissue, as well as space around the tissue where, for example, instruments being used to perform the operation are located. In other examples, an operational area may be at least partially disposed external to the body. For instance, medical system 200 may be used to perform an open medical procedure such that part of the operational area (e.g., tissue being operated on) is internal to the body while another part of the operational area (e.g., a space around the tissue where one or more instruments may be disposed) is external to the body. A instrument may be referred to as being located at or within an operational area when at least a portion of the instrument (e.g., a distal end of the instrument) is located within the operational area.

User control system 204 may be configured to facilitate control by clinician 210-1 of manipulator arms 212 and instruments attached to manipulator arms 212. For a surgical procedure, for example, clinician 210-1 may be a surgeon. For example, clinician 210-1 may interact with user control system 204 to remotely move or manipulate manipulator arms 212 and the instruments. To this end, user control system 204 may provide clinician 210-1 with imagery (e.g., high-definition 3D imagery) of an operational area associated with patient 208 as captured by an imaging device. In some examples, this captured imagery may be referred to as imagery of an internal view of the body of patient 208. In certain examples, user control system 204 may include a stereo viewer having two displays where stereoscopic images of the internal view of the body of patient 208 generated by a stereoscopic imaging device may be viewed by clinician 210-1. Clinician 210-1 may utilize the imagery to perform one or more procedures with one or more instruments attached to manipulator arms 212.

To facilitate control of instruments, user control system 204 may include a set of master controls. These master controls may be manipulated by clinician 210-1 to control movement of instruments (e.g., by utilizing robotic and/or teleoperation technology). The master controls may be configured to detect a wide variety of hand, wrist, and finger movements by clinician 210-1. In this manner, clinician 210-1 may intuitively perform a procedure using one or more instruments.

Auxiliary system 206 may include one or more computing devices configured to perform primary processing operations of medical system 200. In such configurations, the one or more computing devices included in auxiliary system 206 may control and/or coordinate operations performed by various other components of medical system 200 such as manipulating system 202 and/or user control system 204. For example, a computing device included in user control system 204 may transmit instructions to manipulating system 202 by way of the one or more computing devices included in auxiliary system 206. As another example, auxiliary system 206 may receive and process image data representative of imagery captured by an imaging device attached to one of manipulator arms 212.

In some examples, auxiliary system 206 may be configured to present visual content to team members 210 who may not have other access to the images provided to clinician 210-1 at user control system 204. To this end, auxiliary system 206 may include a display monitor 214 configured to display one or more user interfaces, one or more images (e.g., 2D images) of the operational area, information associated with patient 208 and/or the medical procedure, and/or any other content as may serve a particular implementation. In some examples, display monitor 214 may display images of an internal view of the operational area together with additional content (e.g., graphical content, contextual information, etc.) concurrently displayed with the images. Display monitor 214 may be implemented by a touchscreen display with which team members 210 may interact (e.g., by way of touch gestures) to provide user input to medical system 200, or may be implemented by any other type of display screen as may serve a particular implementation.

As will be described in more detail below, system 100 may be implemented within or may operate in conjunction with medical system 200. For instance, in certain implementations, system 100 may be implemented by auxiliary system 206 (e.g., using a display device such as display monitor 214) or by another device such as a device worn by a team member 210 (e.g., assistant 210-2). As such, and as will be described and illustrated in more detail below, auxiliary system 206 may be configured to also display, along with displaying images of the internal view, images of an external view of the body (e.g., the body of patient 208) together with which a shape overlay indicative of the extent of a field of view of an imaging device may be displayed in accordance with principles described herein.

Manipulating system 202, user control system 204, and auxiliary system 206 may be communicatively coupled one to another in any suitable manner. For example, as shown in FIG. 2, manipulating system 202, user control system 204, and auxiliary system 206 may be communicatively coupled by way of control lines 216, which may represent any wired or wireless communication link as may serve a particular implementation. To this end, manipulating system 202, user control system 204, and auxiliary system 206 may each include one or more wired or wireless communication interfaces, such as one or more local area network interfaces, Wi-Fi network interfaces, cellular interfaces, etc.

Figure 3:
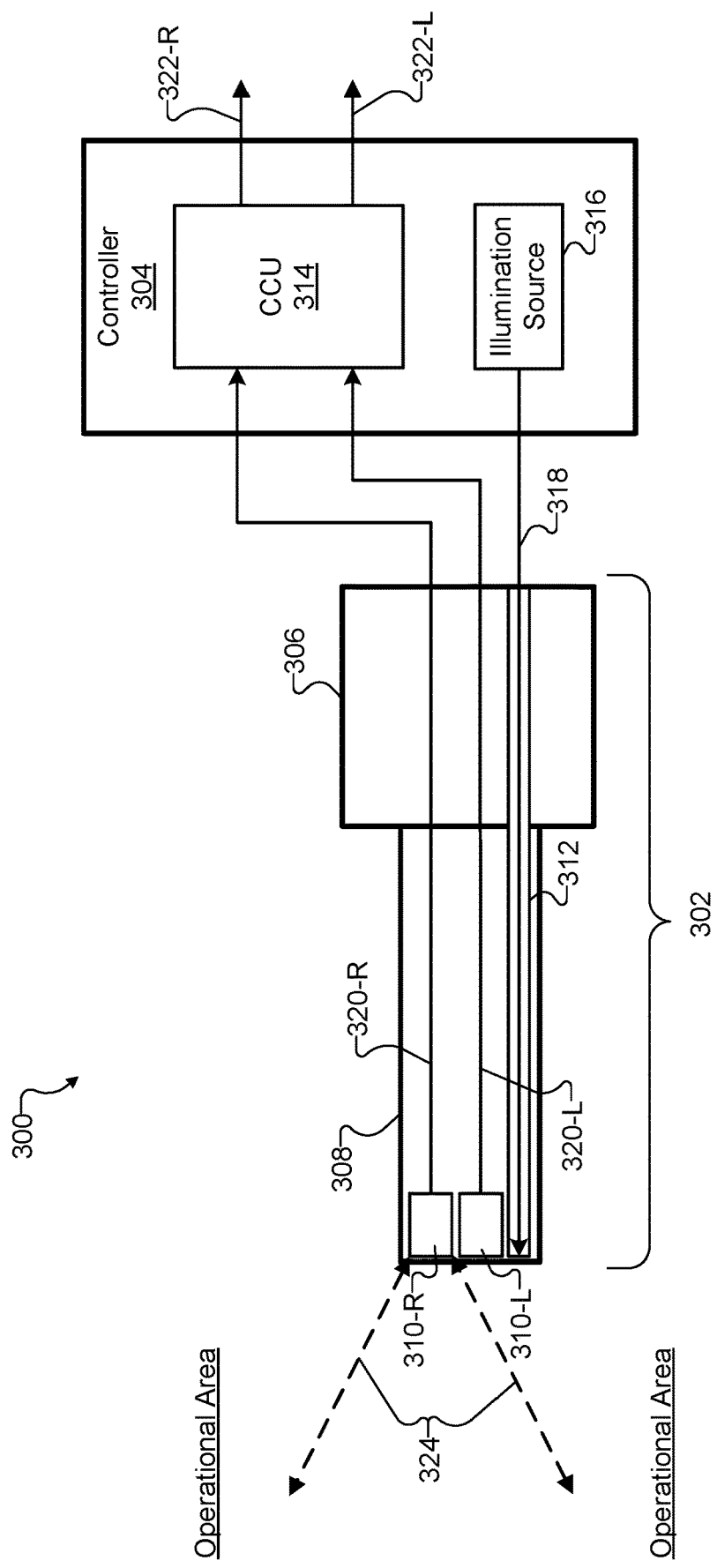
FIG. 3 illustrates an exemplary imaging device located at an operational area according to principles described herein.

FIG. 3 illustrates an exemplary imaging system 300 that may be used in accordance with the systems and methods described herein to capture images of an internal view of a body (e.g., images of an operational area within the body). As shown, imaging system 300 includes an imaging device 302 and a controller 304. Imaging system 300 may include additional or alternative components as may serve a particular implementation. For example, imaging system 300 may include various optical and/or electrical signal transmission components (e.g., wires, lenses, optical fibers, choke circuits, waveguides, etc.), a cable that houses electrical wires and/or optical fibers and that is configured to interconnect imaging device 302 and controller 304, or the like.

Imaging device 302 may be implemented by an endoscope or similar such imaging tool (e.g., a laparoscope, etc.) configured to capture imagery of a scene such as an internal view of any of the bodies described herein. In the example of FIG. 3, imaging device 302 is stereoscopic. In other examples, however, imaging device 302 may be monoscopic (e.g., by including one image sensor instead of two image sensors). Additionally, while imaging devices such as endoscopes, laparoscopes, and so forth may detect light in confined operational areas in the manner described herein in relation to FIG. 3, it will be understood that other imaging technologies (e.g., ultrasound imaging, imaging outside of the visible light range, etc.) and other types of imaging devices or combinations of devices may be used to capture an internal view of a body in other examples.

For instance, ultrasound imaging or other such technologies may be employed in certain examples in which an imaging device includes an ultrasound probe that is inserted into an operational area and may be manipulated using instruments attached to manipulator arms, rather than being controlled by itself being directly attached to a manipulator arm. As another example, hyperspectral imaging technologies and tools may be used to capture images in other regions of the electromagnetic spectrum other than the visible light spectrum. This may facilitate, for example, imaging of features (e.g., blood vessels, etc.) that may be underneath an outer surface that reflects visible light. Similarly, performing infrared, ultraviolet, or other hyperspectral imaging may allow for imaging techniques in which fluorescent imaging agents are injected into tissue to highlight different features at different times due to known metabolization and/or decomposition patterns of the imaging agents. Such imaging technologies may be implemented by different modalities supported by a single imaging system (e.g., imaging system 300) or by different imaging systems (e.g., an imaging system that may be swapped in for imaging system 300 if desired by the medical team performing the operation).

As shown, imaging device 302 includes a camera head 306, a shaft 308 coupled to and extending away from camera head 306, image sensors 310 (i.e., a right-side image sensor 310-R and a left-side image sensor 310-L) at a distal end of shaft 308, and an illumination channel 312. Each of these elements will now be described in more detail.

Imaging device 302 may be manually handled and controlled (e.g., by a surgeon, other clinician, or assistant performing or supporting a medical procedure on a patient). Alternatively, camera head 306 may be coupled to a manipulator arm of a computer-assisted medical system (e.g., one of manipulator arms 212 of medical system 200) and controlled using robotic and/or teleoperation technology.

The distal end of shaft 308 may be positioned at an operational area that is to be imaged by imaging device 302 (e.g., an operational area included within a patient's body or another suitable body as described herein). In this configuration, imaging device 302 may be used to capture images of anatomy and/or other objects within the operational area. In various implementations, shaft 308 is rigid (as shown in FIG. 3). Alternatively, shaft 308 may be jointed (e.g., including an articulation mechanism to allow for wrist-like movement and control) and/or may be flexible. Additionally, while the distal end of shaft 308 is shown in this example to terminate at an orthogonal angle in relation to the axis of shaft 308 such that imaging device 302 captures imagery of objects around the axis of shaft 308 (i.e., objects that are straight ahead), in other examples, the distal end of shaft 308 may be tapered at an angle (e.g., a 30° angle, a 45° angle, etc.) that is non-orthogonal to the axis of shaft 308. In this way, imaging device 302 may capture imagery of objects that are offset from the axis of shaft 308, thereby allowing for more flexibility in where a field of view of imaging device 302 may be directed.

Image sensors 310 may each be implemented by any suitable image sensor, such as a charge coupled device ("CCD") image sensor, a complementary metal-oxide semiconductor ("CMOS") image sensor, or the like. In some examples, as shown in FIG. 3, image sensors 310 are positioned at the distal end of shaft 308. Alternatively, image sensors 310 may be positioned closer to a proximal end of shaft 308, inside camera head 306, or outside imaging device 302 (e.g., inside controller 304). In these alternative configurations, optics (e.g., lenses, optical fibers, etc.) included in shaft 308 and/or camera head 306 may convey light from a scene to image sensors 310.

Image sensors 310 are configured to detect (e.g., capture, collect, sense, or otherwise acquire) light. For example, image sensor 310-R is configured to detect the light from a right-side perspective, and image sensor 310-L is configured to detect the light from a left-side perspective. The light detected by image sensors 310 may include, for example, visible light reflecting off objects located within the operational area, hyperspectral (i.e., non-visible) light reflecting off the objects, fluorescence illumination generated by a fluorescence imaging agent in the operational area, or any other light having any frequency as may serve a particular implementation. As described in more detail below, image sensors 310 may convert the detected light into data representative of one or more images.

Illumination channel 312 may be implemented by one or more optical components (e.g., optical fibers, light guides, lenses, etc.). As will be described below, illumination may be provided by way of illumination channel 312 to illuminate the operational area and the objects included therein.

Controller 304 may be implemented by any suitable combination of hardware and software configured to control and/or interface with imaging device 302. For example, controller 304 may be at least partially implemented by a computing device included in auxiliary system 206.

Controller 304 includes a camera control unit ("CCU") 314 and an illumination source 316. Controller 304 may include additional or alternative components as may serve a particular implementation. For example, controller 304 may include circuitry configured to provide power to components included in imaging device 302. In some examples, CCU 314 and/or illumination source 316 are alternatively included in imaging device 302 (e.g., in camera head 306).

CCU 314 is configured to control various parameters (e.g., activation times, auto exposure, etc.) of image sensors 310. As will be described below, CCU 314 may be further configured to receive and process image data from image sensors 310. While CCU 314 is shown in FIG. 3 to be a single unit, CCU 314 may alternatively be implemented by a first CCU configured to control right-side image sensor 310-R and a second CCU configured to control left-side image sensor 310-L.

Illumination source 316 may be configured to generate and emit illumination 318. Illumination 318 (which is also referred herein to as light) may travel by way of illumination channel 312 to a distal end of shaft 308, where illumination 318 exits to illuminate a scene.

Illumination 318 may include visible or hyperspectral light having one or more frequency (e.g., color) components. Illumination 318 may additionally or alternatively include fluorescence excitation illumination configured to elicit fluorescence illumination by a fluorescence imaging agent (e.g., by exciting a fluorescence imaging agent that has been injected into a bloodstream of a patient to begin emitting fluorescence illumination). In some examples, the fluorescence excitation illumination has a wavelength in an infrared light region (e.g., in a near-infrared light region). While a single illumination source 316 is shown to be included in controller 304, multiple illumination sources each configured to generate and emit differently configured illumination may alternatively be included in controller 304.

To capture one or more images of a scene, controller 304 (or any other suitable computing device) may activate illumination source 316 and image sensors 310. While activated, illumination source 316 emits illumination 318, which travels via illumination channel 312 to the operational area. Image sensors 310 detect illumination 318 reflected from one or more surfaces of anatomy or other objects in the operational area. In cases where illumination 318 includes fluorescence excitation illumination, image sensors 310 may additionally or alternatively detect fluorescence illumination that is elicited by the fluorescence excitation illumination.

Image sensors 310 (and/or other circuitry included in imaging device 302) may convert the sensed light into image data 320 representative of one or more images of the scene.

For example, image sensor 310-R outputs image data 320-R representative of images captured from a right-side perspective and image sensor 310-L outputs image data 320-L representative of images captured from a left-side perspective. Image data 320 may have any suitable format.

Image data 320 is transmitted from image sensors 310 to CCU 314. Image data 320 may be transmitted by way of any suitable communication link between image sensors 310 and CCU 314. For example, image data 320 may be transmitted by way of wires included in a cable that interconnects imaging device 302 and controller 304.

CCU 314 may process (e.g., packetize, format, encode, etc.) image data 320 and output processed image data 322 (e.g., processed image data 322-R corresponding to image data 320-R and processed image data 322-L corresponding to image data 320-L). Processed image data 322 may be transmitted to an image processor (not shown), which may prepare processed image data 322 for display on one or more display devices (e.g., in the form of a video stream and/or one or more still images). For example, the image processor may, based on image data 322, generate one or more full color images, grayscale images, and/or fluorescence images for display on one or more display devices.

The images captured and provided by system 300 may be representative of surfaces (e.g., anatomical surfaces, object surfaces, etc.) that are included within a field of view of imaging device 302. For example, a field of view 324 associated with the right side of imaging device 302 is illustrated in FIG. 3. While not explicitly shown, it will be understood that a stereoscopically similar (but not identical) field of view may be associated with the left side of imaging device 302. As such, a field of view of imaging device 302 may refer to either of the right-side or the left-side fields of view, to a field of view representing the overlap of both fields of view, to a field of view representing the combination of both fields of view, or to any other suitable field of view associated with imaging device 302 in a particular implementation.

At any given moment, the extent of the field of view of imaging device 302 may be determined by various factors. For example, the extent of the field of view may incorporate a spatial pose (e.g., a spatial location, spatial orientation, viewing angle, etc.) of the field of view, which may be determined at least partly based on the spatial pose of imaging device 302 itself (and particularly the distal end of imaging device 302).

Additionally, the extent of the field of view may incorporate the shape of the field of view (e.g., which could be rectangular, square, circular, or the like in different implementations), the size or width of the field of view, and other such factors. As will be described in more detail below, these non-pose types of factors may each be defined by one or more parameters associated with imaging device 302. Such parameters may be referred to herein as device-specific parameters (because they are specific to imaging device 302 or to another particular imaging device) and may define any of the following aspects of a particular imaging device.

One device-specific parameter may define an imaging device form of a particular imaging device (e.g., an endoscopic imaging device such as imaging device 302, a module-based imaging device such as an ultrasound module, etc.). Another device-specific parameter may define an imaging technology (e.g., ultrasound, visible light, hyperspectral light, etc.) employed or supported by a particular imaging device. Another device-specific parameter may define one or more intrinsic parameters of camera optics or image sensors employed by a particular imaging device (e.g., lens diameters, focal lengths, etc.). Another device-specific parameter may define an angle (e.g., 0°, 30°, etc.) at which the distal end of a particular imaging device is tapered to allow for field of view steering. Another device-specific parameter may define whether a particular imaging device has an articulation mechanism allowing the field of view to be steered in different directions other than along the axis of the shaft of the imaging device. Another device-specific parameter may define a total length of a particular imaging device (e.g., defining how deep the imaging device may be inserted into the body). Another device-specific parameter may define the type of focus mechanism with which a particular imaging device is equipped (e.g., a fixed-range focus, a variable-range focus, etc.). Another device-specific parameter may define what zoom options (e.g., optical or digital zoom options) and/or zoom levels are supported by a particular imaging device. Another device-specific parameter may define whether a particular imaging device is monoscopic or stereoscopic and, if stereoscopic, may define aspects such as a baseline distance between stereoscopic imaging elements included in the imaging device. As will be described in more detail below, any of these or any other suitable device-specific parameters may be used, along with data representative of a spatial pose of an imaging device, to determine an extent of a field of view of an imaging device.

During an operation performed by medical system 200, imaging device 302 may capture imagery included within a field of view of imaging device 302 (e.g., field of view 324). This imagery may depict an internal view of the body upon which the operation is being performed, and may be provided to team members 210. For instance, the imagery may be provided to clinician 210-1 by way of user control system 204, thereby allowing clinician 210-1 to have visibility into the operational area as the operation is performed using manipulating system 202. Additionally, the imagery may be provided to assistant 210-2 and/or to other team members 210 by way of auxiliary system 206, thereby facilitating these team members in effectively performing their respective tasks. For instance, assistant 210-2 may be responsible for inserting new instruments and/or supplies (e.g., suturing materials, patching materials, etc.) into the operational area where such instruments and supplies may be employed by clinician 210-1 in performing the operations. As such, it may be desirable for assistant 210-2 to easily determine where clinician 210-1 has visibility within the body (e.g., the extent of the field of view of the imaging device providing the imagery of the internal view) so that assistant 210-2 may insert the instruments and/or supplies into the operational area in a manner that is predictable and helpful to clinician 210-1. For example, it may be desirable for assistant 210-2 to insert objects into the field of view where clinician 210-1 will easily be able to see and begin using them, rather than, for example, inserting the objects into a part of the operational area where clinician 210-1 does not have visibility, or into a part of the body that is not necessarily part of the operational area (e.g., behind tissue being operated on, etc.). To this end, system 100 may be configured to present assistant 210-2 with a convenient and easy-to-understand indication of the extent of the field of view using mixed reality technology. Specifically, an external view (e.g., from a vantage point of assistant 210-2 or similar external vantage point providing a view of the body) may be augmented with a shape overlay indicative of the extent of the field of view.

Figure 4:
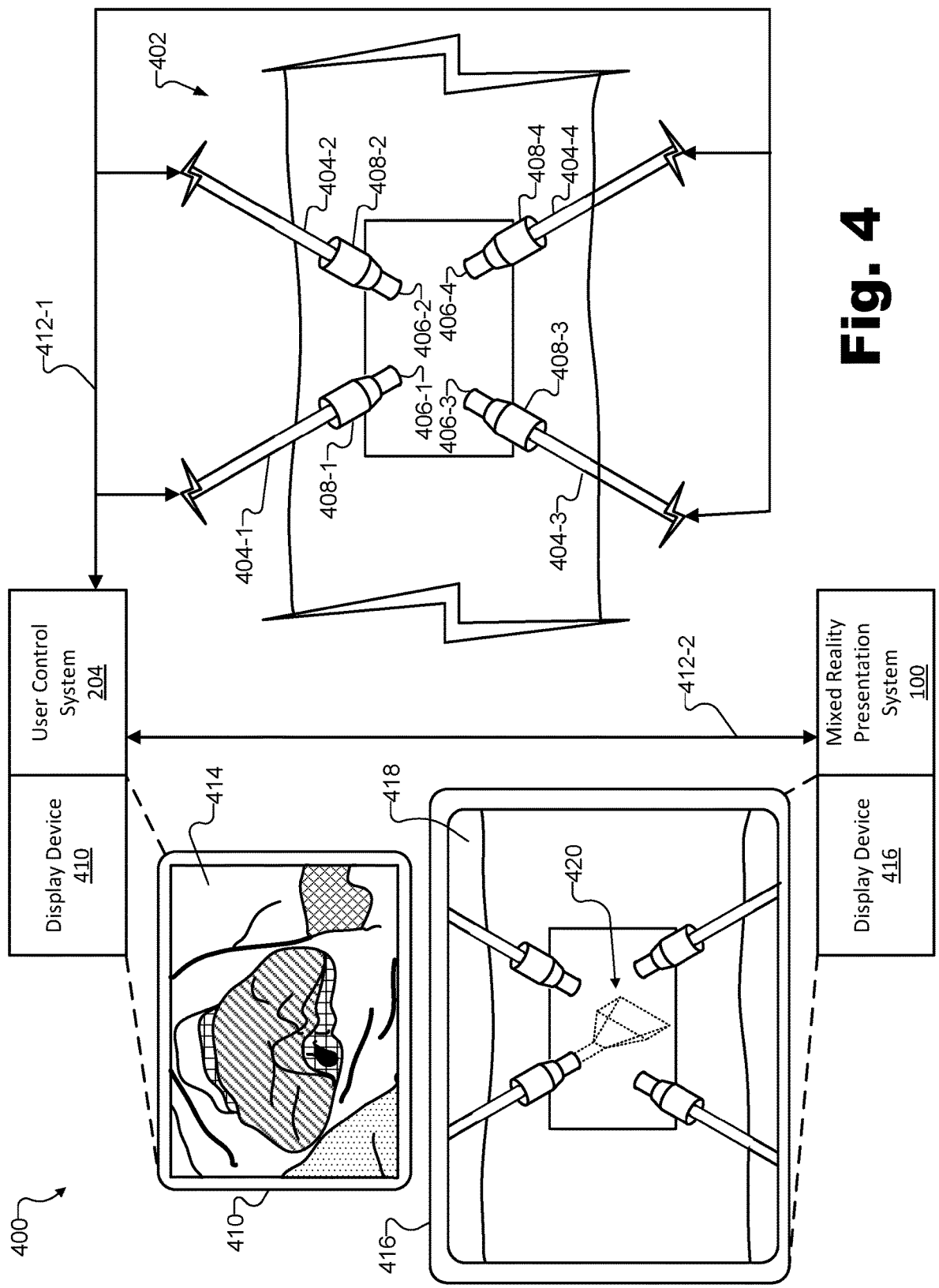
FIG. 4 illustrates an exemplary configuration within which the mixed reality presentation system of FIG. 1 operates to indicate an extent of a field of view of an imaging device according to principles described herein.

To illustrate, FIG. 4 shows an exemplary configuration 400 within which system 100 may operate to indicate an extent of a field of view of an imaging device. Specifically, configuration 400 shows an external view 402 of a body (e.g., a body of a patient or other type of body upon which an operation is being performed as described herein). It will be understood that much of the body may be covered by surgical drapes or the like, but a certain area (e.g., the rectangular area visible in external view 402) may be exposed to allow a plurality of instruments 404 (e.g., instruments 404-1 through 404-4) to be inserted into an operational area internal to the body through a plurality of respective ports 406 (e.g., ports 406-1 through 406-4) and by way of a plurality of respective cannulas 408 (e.g., cannulas 408-1 through 408-4). While not explicitly shown in configuration 400, it will be understood that each instrument 404 may, in some examples, be coupled to a respective manipulator arm of a manipulating system (e.g., one of manipulator arms 212 of manipulating system 202) as described above with respect to medical system 200.

As described above, medical system 200 may facilitate team members 210 in actively managing (e.g., controlling, etc.) instruments 404 during every phase of an operation performed upon the body using instruments 404. For example, as described above, a display device 410 that is associated with (e.g., integrated into) user control system 204 may be viewed by clinician 210-1 as clinician 210-1 manipulates the manipulator arms to control instruments 404 to thereby perform the operation. As shown, a data communication 412-1 may take place between user control system 204 and each instrument 404. Thus, for example, if instrument 404-1 is an imaging device configured to capture imagery of an internal view of the body, instrument 404-1 may provide data communication 412-1 that is representative of imagery 414 to user control system 204, which, as shown, may be displayed to clinician 210-1 by way of display device 410. While display device 410 illustrates a single (i.e., monoscopic) display depicting imagery 414, it will be understood that, in certain examples, instrument 404-1 may be implemented as a stereoscopic imaging device (e.g., like imaging device 302), and display device 410 may present stereoscopic versions of imagery 414 of the internal view to each eye of clinician 210-1 to allow clinician 210-1 to see the internal view in three dimensions.

In the example of FIG. 4 and other figures described below, instrument 404-1 will be understood to be an imaging device similar or the same as imaging device 302 and, as such, will be referred to as imaging device 404-1. Other illustrated instruments 404-2 through 404-4 will be understood to be other types of instruments used for manipulating tissue and otherwise performing actions associated with the operation. As such, and as described above, clinician 210-1 may request that assistant 210-2 (or another team member) introduce a particular instrument or a particular object into the operational area by way of a particular port 406 and a particular cannula 408.

However, even if assistant 210-2 can see both external view 402 (i.e., the natural view from the vantage point the assistant has of the body) and imagery 414 of the internal view (e.g., which may be provided not only to display device 410 but also to a display device visible to the assistant such as display monitor 214), it may be difficult to correlate what is seen in the internal and the external views to determine how to effectively introduce the new instrument or object, or to otherwise assist clinician 210-1 (e.g. a surgeon) in a helpful manner. This challenge may be particularly pronounced when imaging device 404-1 supports an angled lens and/or an articulation mechanism allowing the field of view to be angled in various directions away from the axis of the shaft of imaging device 404-1, and/or when imaging device 404-1 is characterized by various other parameters described above. Additionally, it may be particularly challenging for assistants to mentally correlate the internal and external views when the vantage point of the assistant is not in line with the imaging device (e.g., when the assistant is viewing the body from a location offset or angled from where the imaging device is inserted, such as from an opposite side of the body from the side into which the imaging device is inserted, etc.).

Accordingly, rather than requiring assistant 210-2 to attempt to mentally correlate external view 402 with imagery 414 of the internal view in order to mentally visualize the current position, orientation, shape, and size of the field of view, FIG. 4 shows that system 100 may provide a mixed reality presentation to automatically show assistant 210-2 the extent of the field of view in real time. Specifically, as shown, system 100 may receive a data communication 412-2 from user control system 204 and/or from other sources that may include parameter data, kinematic data, image data, and/or other such data. In response, system 100 may determine one or more device-specific parameters of imaging device 404-1, the spatial pose of imaging device 404-1, and/or other information necessary to determine the extent of the field of view of imaging device 404-1 with respect to external view 402. System 100 may then direct a display device 416 to present a mixed reality presentation 418 to a user of system 100 (e.g., to assistant 210-2 or another such user). As shown, mixed reality presentation 418 may facilitate the user in mentally visualizing the relationship between the view from his or her external vantage point (e.g., external view 402) and the internal view captured by imaging device 404-1 (e.g., depicted by imagery 414) by depicting external view 402 together with a shape overlay 420 that is indicative of the extent of the field of view relative to the body.

Display device 416 may be implemented in any suitable way and/or by any suitable device including a dedicated mixed reality headset device, display monitor 214 associated with auxiliary system 206, display device 410 associated with user control system 204, or the like. Additionally, system 100 and display device 416 may be related to one another in any manner as may serve a particular implementation, such as by display device 416 being integrated into system 100, display device 416 being separate from and communicatively coupled to system 100, or in any other suitable way.

For instance, one exemplary implementation of system 100 may include a mixed reality media player device (e.g., an augmented reality headset) that is configured to be worn on a head of a user and a communication interface included within the mixed reality media player device (e.g., a communication interface communicatively coupled to imaging device 404-1 and configured to access data received from imaging device 404-1). This implementation of system 100 may also include a first physical display included within the mixed reality media player device and configured to provide a graphical presentation to a first eye of the user when the mixed reality media player device is worn on the head of the user and a second physical display configured to provide a graphical presentation to a second eye of the user when the mixed reality media player device is worn on the head of the user. The mixed reality media player device may further include a memory and a processor configured to perform the operations described above as being performed by storage facility 102 and processing facility 104, respectively.

In this example, display device 416 may be collectively implemented by the first and second physical displays included within the mixed reality media player device. As such, rather than the two-dimensional ("2D"), monoscopic mixed reality presentation 418 illustrated in FIG. 4, a 3D, stereoscopic mixed reality presentation 418 may be presented to the user by the first and second physical displays. Regardless of how many separate physical displays are used to implement display device 416, it will be understood that the display device may present a mixed reality (e.g., as opposed to a virtual reality) presentation in the sense that the presentation combines a mix of one or more real elements (e.g., elements visible in external view 402) and one or more virtual elements (e.g., shape overlay 420).

While mixed reality presentation 418 includes a mix of both real and virtual elements, it will be understood that the real and virtual elements may be presented in different ways. For example, in certain implementations, a camera associated with system 100 may provide a photographic rendering of external view 402 that the virtual elements may be combined with and presented to the user on a standard (i.e., opaque) screen.

In other examples, system 100 may employ one or more see-through displays upon which the virtual elements are presented in front of (e.g., overlaid onto) a direct view of the real external view. For example, the first physical display in the implementation of system 100 described above may be a first see-through display configured to provide, in the graphical presentation to the first eye of the user, a first combination of: 1) imagery of external view 402 of the body provided by light passing through the first see-through display, and 2) a first depiction of shape overlay 420 provided by light generated by the first see-through display to display shape overlay 420 together with external view 402 for the first eye. Similarly, the second physical display in this implementation of system 100 may be a second see-through display configured to provide, in the graphical presentation to the second eye of the user, a second combination of: 1) the imagery of external view 402 of the body provided by light passing through the second see-through display, and 2) a second depiction of shape overlay 420 provided by light generated by the second see-through display to display shape overlay 420 together with external view 402 for the second eye.

Other exemplary implementations of system 100 may not include or be associated with a mixed reality media player device worn by the user. Rather, these exemplary implementations may include, for example, a mixed-reality-enabled display monitor device (e.g., implemented by display monitor 214 of auxiliary system 206) that is configured for viewing by a user without being worn by the user and a communication interface included within the mixed-reality-enabled display monitor device (e.g., a communication interface communicatively coupled to imaging device 404-1 and configured to access data received from imaging device 404-1). This implementation of system 100 may also include a physical display included within the mixed-reality-enabled display monitor device and configured to display a combination of 1) external view 402 of the external view of the body captured by a camera located at a vantage point associated with external view 402 of the body, and 2) a depiction of shape overlay 420 generated by the physical display. The mixed-reality-enabled display monitor device may further include a memory and a processor configured to perform the operations described above as being performed by storage facility 102 and processing facility 104, respectively. In this example, display device 416 may be implemented by the physical display included within the mixed-reality-enabled display monitor device.

Shape overlay 420 may be displayed together with external view 402 in a manner that integrates shape overlay 420 with the objects included in the external view. Put another way, shape overlay 420 may be displayed within mixed reality presentation 418 in a manner that augments external view 402 in accordance with established mixed reality techniques and technologies. To this end, as shown in the example of mixed reality presentation 418, system 100 may direct display device 416 to display shape overlay 420 together with external view 402 by directing display device 416 to display shape overlay 420 overlapping external view 402 such that a shape depicted in shape overlay 420 appears to be integrated with one or more objects visible in external view 402.

Shape overlay 420 may include one or more virtual objects and/or other augmentations configured to be displayed together with real imagery in mixed reality presentation 418. As such, shape overlay 420 may be implemented in any suitable way such as, for example, by depicting a 3D geometric shape having a form of a rectangular pyramid, a rectangular frustum, a circular cone, a circular frustum, or any other 3D geometric shape as may serve a particular implementation. In other examples, shape overlay 420 may depict a 2D shape corresponding to any one of these 3D shapes, or may depict another 2D shape, 3D shape, or other such augmentation as may serve a particular implementation. As will be described and illustrated in more detail below, a shape overlay may further depict other objects along with depicting a shape. For example, such objects may include a representation of a distal end of an imaging device, a portion of a cannula or other hardware associated with a port, a simulated depiction of an internal area within the body, or any other such object as may serve a particular implementation.

Shape overlay 420 may be rendered in various ways to conveniently indicate various types of information to a user (e.g., a viewer of mixed reality presentation 418 on display device 416), or to otherwise facilitate indicating the extent of the field of view of imaging device 404-1.

To illustrate, FIGS. 5A through 5I illustrate various exemplary shape overlays 500 (i.e., shape overlays 500-A through 500-I shown in FIGS. 5A through 5I, respectively) that may be displayed by a display device as directed by an implementation of system 100. Each of shape overlays 500 may represent a particular implementation of shape overlay 420 (or a portion thereof) that may be displayed on a display device (e.g., display device 416) and that may be based on certain settings (e.g., user preferences, etc.) of system 100. While shape overlays 500-A through 500-I primarily illustrate respective shapes that may be depicted in exemplary shape overlays, it will be understood that other objects not shown in shape overlays 500-A through 500-I (e.g., virtual representations of a distal end of an imaging device, etc.) may further be depicted in various shape overlays. Examples of such objects will be illustrated in more detail below.

Figure 5A:
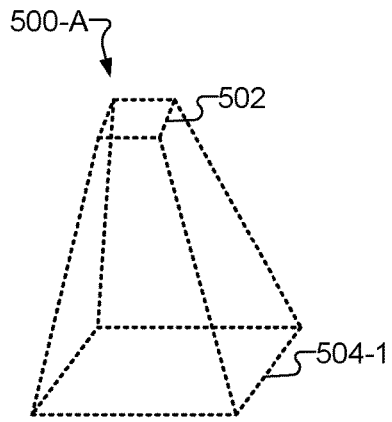
FIGS. 5A-5I illustrate various exemplary shape overlays and aspects thereof that may be displayed by a display device as directed by the mixed reality presentation system of FIG. 1 according to principles described herein.

FIG. 5A shows shape overlay 500-A, which depicts a 3D rectangular frustum shape having a face of origination 502 that corresponds to the location of the imaging device, as well as a base 504-1 that is presented opposite the location of the imaging device. As shown, shape overlay 500-A depicts a rectangular frustum shape in wireframe form such that all of the edges of the shape are visible. Additionally or alternatively, shape overlay 500-A may be understood to depict a shape that is at least partially transparent, thereby allowing all of the edges and faces of the shape to be visible.

Figure 5B:
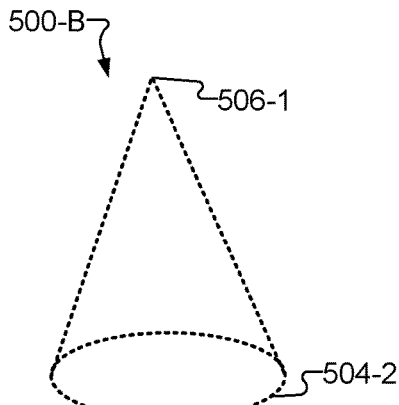

FIG. 5B shows shape overlay 500-B, which depicts a 3D cone shape having a point of origination 506-1 that corresponds to the location of the imaging device. As shown, shape overlay 500-B also includes a base 504-2 that, like base 504-1, is presented opposite the location of the imaging device.

Figure 5C:
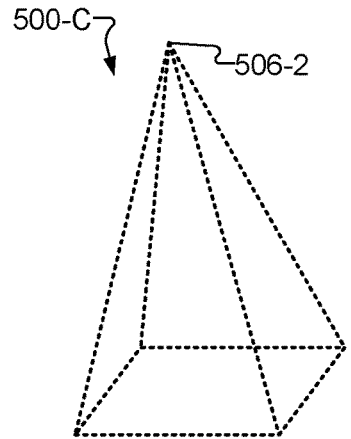

FIG. 5C shows shape overlay 500-C, which depicts a 3D pyramid shape that is similar to the frustum depicted in shape overlay 500-A but, instead of a face of origination such as face 502, includes a point of origination 506-2. It will be understood that, as mentioned above, other geometric shapes (e.g., 2D geometric shapes, 3D geometric shapes, etc.) may similarly be depicted by a shape overlay. For instance, a shape overlay may depict a 3D circular frustum having a face of origination, or any other suitable 3D or 2D shape.

Figure 5D:
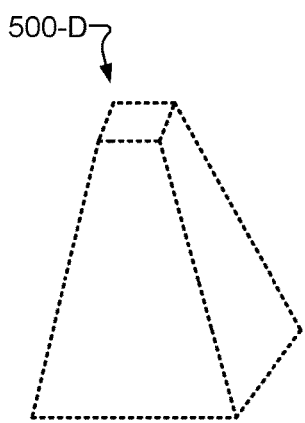

FIG. 5D shows shape overlay 500-D, which, in contrast to the wireframe and/or transparent shapes depicted in other examples, depicts an opaque (i.e., non-transparent) rectangular frustum. Any degree of transparency and/or manner of construction (e.g., line style, color, texture, etc.) of the shapes depicted in shape overlays 500 may be employed as may serve a particular implementation or, in certain examples, as may be preferred by a particular user.

Figure 5E:
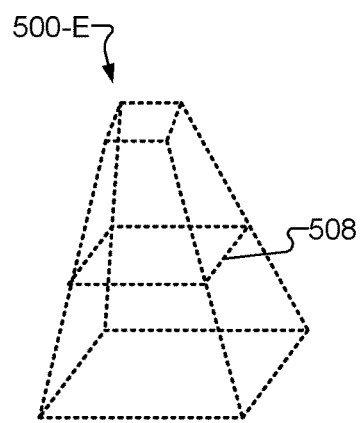

FIG. 5E shows shape overlay 500-E, which depicts a shape that not only includes a face of origination and a base similar to shapes depicted in other shape overlays 500 described above, but further includes a cross section 508. As shown, cross section 508 is shown to be parallel to, yet distinct from, the face of origination and the base. Cross section 508 may be used to illustrate various image device characteristics such as a focus depth of the imaging device (e.g., a nominal focus depth, a current focus depth, etc.). As will be described in more detail below, any information that may be indicated by a base of a shape depicted in a shape overlay (e.g., tissue depth or the like, as will be described in more detail below) may alternatively be indicated by a cross section 508 that is distinct from the base.

Figure 5F:
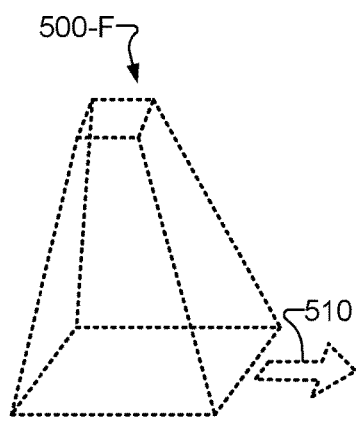

FIG. 5F shows shape overlay 500-F, which depicts not only a 3D frustum shape, but also an indicator arrow 510 that indicates an orientation of the field of view represented by the frustum shape. Indicator arrow 510 may be configured to indicate, for instance, which side of the base of the frustum corresponds to a top side of imagery provided by the imaging device (e.g., a top side of imagery 414 in FIG. 4). In other examples, rather than an indicator arrow, the orientation may be indicated in other ways such as by depicting a dot or other such marker at a particular corner or side of the base of the frustum (e.g., a dot to indicate the top-left corner of the imagery, etc.), showing a particular side with a particular color, including text within the shape overlay, depicting an icon or avatar representative of clinician 210-1 (e.g., a surgeon) to show the orientation at which clinician 210-1 is viewing the imagery in the field of view, or any other way as may serve a particular implementation.

Figure 5G:
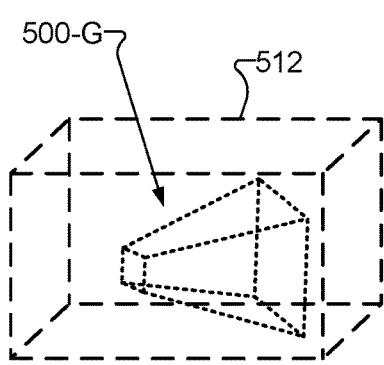

FIG. 5G shows shape overlay 500-G, which is depicted together with a simulated depiction 512 of an internal portion of a body. As shown, simulated depiction 512 may be displayed together with shape overlay 500-G and with the external view of the body, and may be made to appear to be behind the shape overlay (e.g., between the real elements of the external view and the shape overlay). In some examples, part of simulated depiction 512 may also be displayed so as to appear to be in front of shape overlay 500-G, such that the shape overlay appears to be contained inside of the simulated depiction, just as the shape overlay is meant to appear to be contained inside the body. For instance, as shown, simulated depiction 512 may appear to surround shape overlay 500-G, thereby making it easier for a viewer to visualize that shape overlay 500-G is actually inside the body with the imaging device (rather than merely overlaid onto the external view of the body). In certain examples, a simulated depiction of an internal portion of the body may also include a depiction of other elements such as a virtual port, a virtual cannula, or the like, whereby the imaging device is inserted into the body.

Figure 5H:
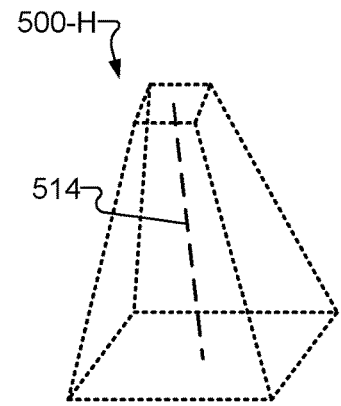

FIG. 5H shows shape overlay 500-H, which includes an image capture axis 514 indicative of a center of the imagery being captured by the imaging device. Image capture axis 514 may indicate, for example, an area of focus that clinician 210-1 may be currently concerned with more than other areas within the field of view of imaging device 404-1.

Figure 5I:
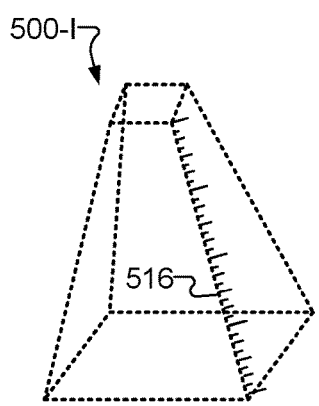

FIG. 5I shows shape overlay 500-I, which includes a ruler 516 indicative of a distance from the face of origination (i.e., a distance from the imaging device) to a base or cross section of the shape. While ruler 516 is shown to be drawn along an edge of the geometric shape in shape overlay 500-I, it will be understood that ruler 516 may, in other examples, be drawn along an image capture axis such as image capture axis 514, along a different dimension (e.g., any of an x, y, or z dimension), of the like.

The features described with respect to shape overlays 500-A through 500-I are exemplary only. In other shape overlays, any of the features described above, any other suitable features, or any combination thereof, may also be employed. In some examples, a shape overlay may additionally or alternatively indicate different types of information by including different colors, line styles, shading styles, degrees of transparency, textual annotations, graphical icons, and so forth. These or other features may be used to indicate, for instance, that a problem has been encountered (e.g., an imaging device failure, an illuminator failure, fogging or debris detected on a lens of the imaging device, a focusing issue, etc.), that a particular mode of the imaging device (e.g., associated with a particular imaging technology, capture frequency, etc.) is being used, that the imaging device has been detected to collide with another instrument, that clinician 210-1 has requested a different imaging device be inserted as the active imaging device, and/or to any other information that may be of interest to user of system 100.

Additionally, it will be understood that various other types of useful information may also be presented in conjunction with any of the shape overlays described herein. For instance, in certain examples, a shape overlay may further provide additional perspective to a user viewing the shape overlay by superimposing an image captured by the imaging device (e.g., a live, real-time video image or a previous still image corresponding to imagery 414) onto a base or cross-section of the shape overlay.

Figure 6:
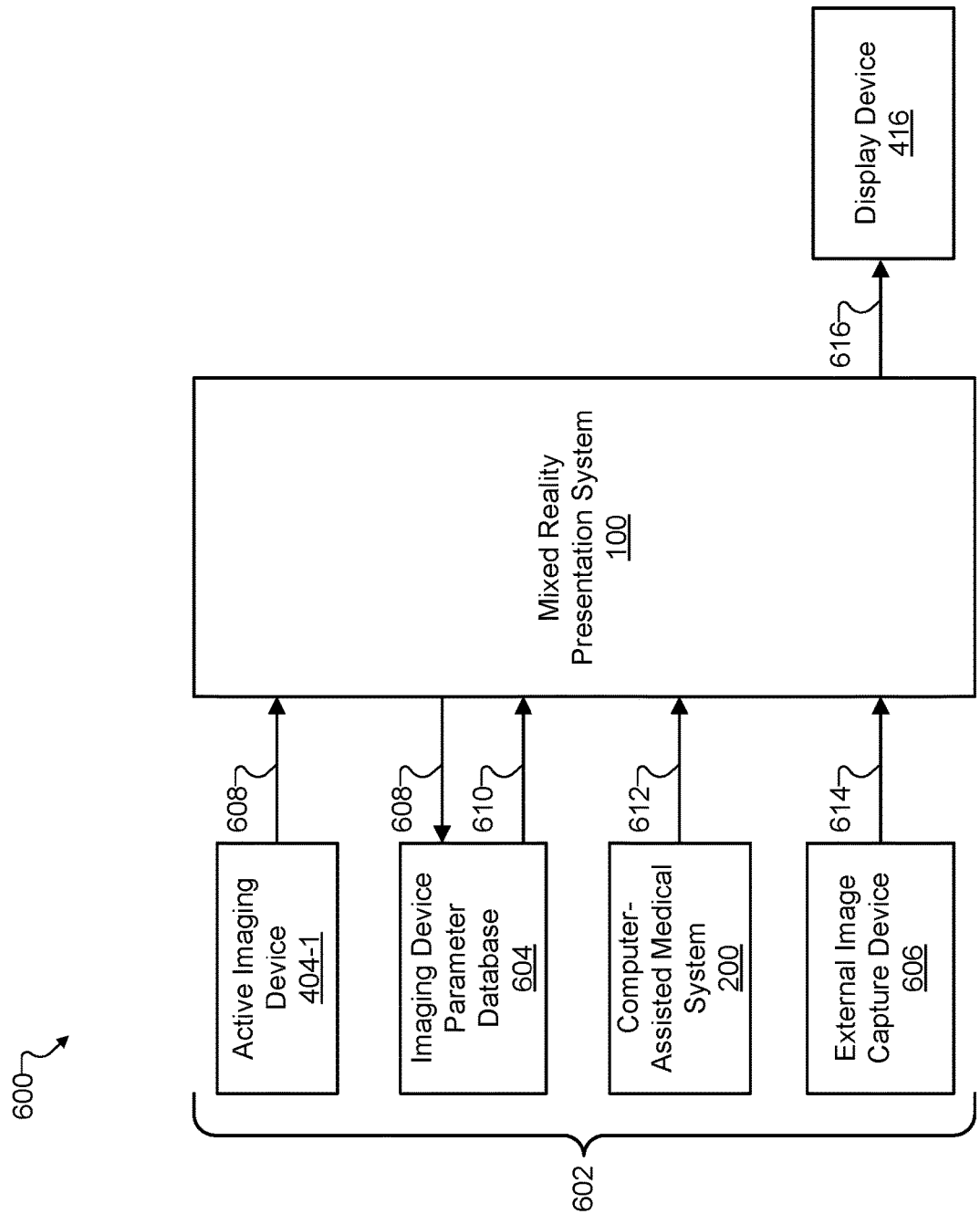
FIG. 6 illustrates another exemplary configuration within which the mixed reality presentation system of FIG. 1 operates to indicate an extent of a field of view of an imaging device according to principles described herein.

FIG. 6 shows another exemplary configuration 600 within which system 100 may operate to indicate an extent of a field of view of an imaging device. In contrast to configuration 400, which, as described above, graphically illustrates how system 100 interrelates with external and internal views of a body, configuration 600 illustrates a set of data sources 602 from which system 100 may receive data that system 100 is configured to analyze and process. For example, based on data received from such data sources 602 as active imaging device 404-1, an imaging device parameter database 604, medical system 200, and an external image capture device 606, system 100 may direct display device 416 to display the shape overlay together with the external view of the body in any of the ways described herein.

As shown, system 100 may selectively receive imaging device data 608 from active imaging device 404-1, parameter data 610 from imaging device parameter database 604, kinematic data 612 from medical system 200, and photographic imagery data 614 from external image capture device 606. It will be understood and made apparent from examples described below that, in some examples, system 100 may receive data from one or more, but not all, of data sources 602. Additionally, in certain examples, system 100 may further receive data from additional data sources not explicitly illustrated in FIG. 6.

As mentioned above in relation to FIG. 4, imaging device 404-1 may be in active use for providing imagery during, before, or after an operation such as a medical procedure. Hence, imaging device 404-1 may also be referred to herein as "active imaging device 404-1." Active imaging device 404-1 may be configured to provide imaging device data 608 to facilitate system 100 in determining the device-specific parameter of active imaging device 404-1. To this end, imaging device data 608 may include any suitable data as may serve a particular implementation.

For example, in certain implementations, imaging device data 608 provided by active imaging device 404-1 may include initialization data that itself is representative of a set of device-specific parameters associated with active imaging device 404-1. As such, system 100 may determine a device-specific parameter by accessing the device-specific parameter from the set of device-specific parameters represented in the initialization data. In some examples, the initialization data provided by active imaging device 404-1 may be provided in accordance with a particular initialization protocol (e.g., a standard device discovery protocol or the like).

Additionally or alternatively, imaging device data 608 received by system 100 from active imaging device 404-1 may include identification data for active imaging device 404-1. While such identification data may be specific to active imaging device 404-1, it will be understood that the identification data, in and of itself, may not directly define or effect an extent of the field of view of active imaging device 404-1 in the same manner as to device-specific parameters described herein. However, in certain implementations, identification data may facilitate system 100 in accessing such device-specific parameters. For example, imaging device data 608 may be representative of a manufacturer of active imaging device 404-1, a model number of active imaging device 404-1, a serial number of active imaging device 404-1, or another suitable identifier associated with active imaging device 404-1. Based on this identification data, system 100 may determine a device-specific parameter by accessing the device-specific parameter from a stored plurality of device-specific parameters associated with a plurality of different imaging devices including active imaging device 404-1. As will now be described, such a plurality of device-specific parameters associated with different imaging devices (e.g., associated with all the imaging devices supported by medical system 200, associated with all the imaging devices available for use in a particular operation, etc.) may be stored and maintained by imaging device parameter database 604.

In response to receiving identification data (e.g., rather than initialization data) as imaging device data 608 from active imaging device 404-1, system 100 may transmit a query to database imaging device parameter database 604. For example, the query may include the identification data from imaging device data 608, as shown. Imaging device parameter database 604 may, based on the identification data included in imaging device data 608, identify one or more device-specific parameters associated with imaging device 404-1 and, as a result, may transmit the one or more device-specific parameters to system 100 as parameter data 610. Imaging device parameter database 604 may include any type of transitory or non-transitory storage, and may be implemented in any manner as may serve a particular implementation. As such, imaging device parameter database 604 should not be understood to be limited to any particular storage or database technology, platform, or paradigm. Additionally, it will be understood that imaging device parameter database 604 may be implemented separately from system 100 (e.g., on a cloud server maintained by a manufacturer of the active imaging device, etc.) or, in some examples, may be integrated with system 100 (e.g., stored locally within storage facility 102).

In examples in which imaging device data 608 represents identification data for active imaging device 404-1, the identification data may be understood to be provided automatically by active imaging device 404-1 or to be received from the active imaging device in a manual fashion. For example, in some implementations, active imaging device 404-1 may be configured to automatically transmit identification data upon request (e.g., when queried by system 100), whereas, in other implementations, active imaging device 404-1 may provide identification data by including a radio-frequency identification ("RFID") tag, bar code, or other such identifier that a user may manually scan into system 100. In still other examples, a user of system 100 may manually select active imaging device 404-1 from a list of available or supported active imaging devices, system 100 may automatically recommend a particular active imaging device 404-1, or the identification of active imaging device 404-1 may be performed in another suitable way.

Whether system 100 receives device-specific parameters directly from active imaging device 404-1 (e.g., by way of initialization data included within imaging device data 608), from imaging device parameter database 604 (e.g., by way of parameter data 610), or from some other data source, it will be understood that the device-specific parameters may define or be descriptive of any of the imaging device parameters described herein. For instance, a few non-limiting examples of a device-specific parameter that may be received from active imaging device 404-1 or imaging device parameter database 604 will now be described.

In one example, a device-specific parameter may characterize the extent of the field of view of active imaging device 404-1 by defining an imaging technology employed by the active imaging device. For instance, this type of device-specific parameter may indicate whether active imaging device 404-1 captures imagery by way of endoscopic technology such as described in relation to FIG. 3, by way of a probe module such as described above in relation to the ultrasound probe imaging device, or by way of another type of imaging technology. Additionally or alternatively, the imaging technology indicated by this type of device-specific parameter may refer to different capabilities or modalities associated with the imaging device, such as whether the imaging device is configured to capture visible light only, or whether it may also capture imagery using a hyperspectral modality, a fluorescence modality, or any other modality described herein or as may serve a particular implementation.

In another example, a device-specific parameter may characterize the extent of the field of view of active imaging device 404-1 by defining a focal length of an image sensor included within active imaging device 404-1, an aspect ratio of the image sensor, or another such parameter associated with the image sensor, optics, or intrinsic capabilities of one or more imaging elements included within active imaging device 404-1.

In yet another example, a device-specific parameter may characterize the extent of the field of view of active imaging device 404-1 by indicating a viewing angle of the field of view relative to the active imaging device. For example, if active imaging device 404-1 includes a lens angled at 30° or another such angle from the axis of the shaft of active imaging device 404-1, the device-specific parameter may indicate this angle such that system 100 may receive data representative of the angle at which the field of view may come off imaging device 404-1.

Medical system 200 was described above in relation to FIG. 2. In the context of configuration 600, medical system 200 may provide kinematic data 612 or other types of data as may help indicate the spatial pose of active imaging device 404-1 or otherwise help characterize the extent of the field of view. Kinematic data 612 may indicate the spatial pose of imaging device 404-1 (e.g., a distal end of imaging device 404-1) by indicating an updated (e.g., real-time) spatial position of imaging device 404-1, an updated orientation of imaging device 404-1 (e.g., including a direction in which an angled lens of imaging device 404-1 is facing), an updated articulation configuration of imaging device 404-1 (e.g., if imaging device 404-1 has an articulation mechanism allowing wrist-like articulation of the distal end of the imaging device), and so forth.

Along with locational and orientational kinematic data, kinematic data 612 may further indicate a current state or setting being employed by active imaging device 404-1. For example, as mentioned, if active imaging device 404-1 is configured to capture imagery of an internal view from different viewing angles by employing a distal articulation mechanism, kinematic data 612 may include data representative of a current articulation of the distal articulation mechanism. In this way, system 100 may direct display device 416 to display the shape overlay based on the spatial pose of active imaging device 404-1 by directing display device 416 to display the shape overlay based on the current articulation of the distal articulation mechanism. Similarly, if active imaging device 404-1 is configured to provide the captured imagery at different zoom levels (e.g., optical or digital zoom levels) supported by the active imaging device, kinematic data 612 may further include data representative of a current zoom level at which active imaging device 404-1 is providing the captured imagery. In this way, system 100 may direct display device 416 to display the shape overlay based on the current zoom level.

External image capture device 606 may be employed in certain implementations in which display device 416 implements an opaque (i.e., non-see-through) display monitor such that the virtual shape overlay is combined with photographic imagery of the external view. In these implementations, a video camera or other type of external image capture device may implement external image capture device 606 to provide photographic imagery data 614 of the external view. Additionally or alternatively, external image capture device 606 may detect one or more markers (e.g., markers detectable based on visual frequencies, hyperspectral frequencies, etc.) that are associated with active imaging device 404-1, other components of medical system 200, the body upon which the operation is being performed using visual data, or the like. In some examples, information about the spatial positioning of such markers may be included with photographic imagery data 614 for use in determining the spatial pose of active imaging device 404-1 in addition to, or as an alternative to, some or all of kinematic data 612.

System 100 may receive any of data 608 through 614 and/or any other suitable data, and may process the data to determine the extent of the field of view of imaging device 404-1. For example, as described above, system 100 may determine, based on the received data, the spatial pose and the device-specific parameter of active imaging device 404-1, and may determine, based on the spatial pose and the device-specific parameter, an extent of the field of view of active imaging device 404-1 relative to the body. More specifically, system 100 may determine the shape, zoom level, current angle, current width, etc., of the field of view based on data 608, 610, and/or 612, as well as determining where the imaging device is located in relation to the body based on kinematic data 612 and/or photographic imagery data 614. To this end, system 100 may be configured to correlate the external view and the shape overlay using any suitable registration techniques and/or technologies (e.g., including calibration techniques; image processing techniques; Simultaneous Localization and Mapping ("SLAM") technologies, marker-based, marker-less, and/or vision-based techniques, a combination of any of these, etc.).

In addition to determining the spatial relationship between the position of the imaging device and the position of the body, system 100 may further be configured to determine a spatial relationship between the position and/or orientation of the field of view of the imaging device and the position and/or orientation of the image display of the display device by way of which the external view and the shape overlay are presented to the user. As with the spatial relationship between the imaging device and the body, the spatial relationship between the field of view of the imaging device and the image display device may be determined in any suitable way and using any registration techniques and/or technologies described herein. For example, system 100 may determine the position and/or orientation of the field of view of the imaging device by determining the position and/or orientation of a part of the imaging device and accessing information describing the geometry of the spatial relationship between the field of view of the imaging device and that part of the imaging device. As another example, system 100 may determine the position and/or orientation of the field of view of the image display of the display device by determining the position and/or orientation of a part of the display device and accessing information describing the geometry of the spatial relationship between the image display of the display device and that part of the display device.

Thus, for instance, in some examples, system 100 may determine the spatial relationship between the positions and/or orientations of the display device and the imaging device using a direct spatial transform between the respective positions and/or orientations of the display device and the imaging device. In other examples, system 100 may determine the spatial relationship using a series of transforms linking the respective positions and/or orientations. For example, one series of transforms may include a first transform from the position and/or orientation of the display device to the position and/or orientation of the body, and a second transform from the position and/or orientation of the body to the position and/or orientation of the imaging device. As another example, a series of transforms may include a first transform from the position and/or orientation of the display device to a particular component of a manipulating system, and one or more additional transforms from the particular component of the manipulating system through various links and joints of the manipulating system (e.g., one or more links or joints of a manipulator arm included in the manipulating system) to the position and/or orientation of the imaging device. Any of these transforms or other suitable transforms may be derived based on kinematic data, visual or non-visual data based on passive or active markers or indicia, or using any other data, technique, or technology described herein or as may serve a particular implementation.

System 100 may direct display device 416 to display the shape overlay based on the determining of the extent of the field of view relative to the body. For example, system 100 may direct display device 416 to display the shape overlay by generating and transmitting shape overlay data 616 to display device 416. As shown, system 100 may receive shape overlay data 616 from system 100 and may use shape overlay data 616 to display the shape overlay together with the external view. Specifically, based on shape overlay data 616, display device 416 may display the shape overlay to indicate the extent of the field of view relative to the body, including the proper position of the field of view, the proper shape and size of the field of view, and so forth.

To further illustrate various shape overlays that may be displayed in a mixed reality presentation presented by a display device at the direction of system 100, FIGS. 7-10 illustrate display device 416 displaying different exemplary shape overlays together with an exemplary external view of a body according to principles described herein. FIGS. 7-10 illustrate that different shape overlays may be displayed based on different data received in configuration 600.

Each of FIGS. 7-10 show display device 416 presenting mixed reality presentation 418. As described above, mixed reality presentation 418 includes real elements of an external view of a body combined with virtual elements displayed by display device 416. As shown in each of FIGS. 7-10, for instance, mixed reality presentation 418 combines real elements of external view 402 with virtual elements of a shape overlay. For example, as shown in FIGS. 7-10 and as described above, real elements viewable in external view 402 include, without limitation, an external surface of the body (e.g., skin, surgical drapes, etc.), an external portion of active imaging device 404-1, an external portion of cannula 408-1 at port 406-1, and so forth. As shown in FIGS. 7-10, each of the real elements included in external view 402 are depicted with solid lines. As described above, these real elements may be presented on display device 416 based on real-time photographic imagery or directly through a see-through display.

Figure 7:
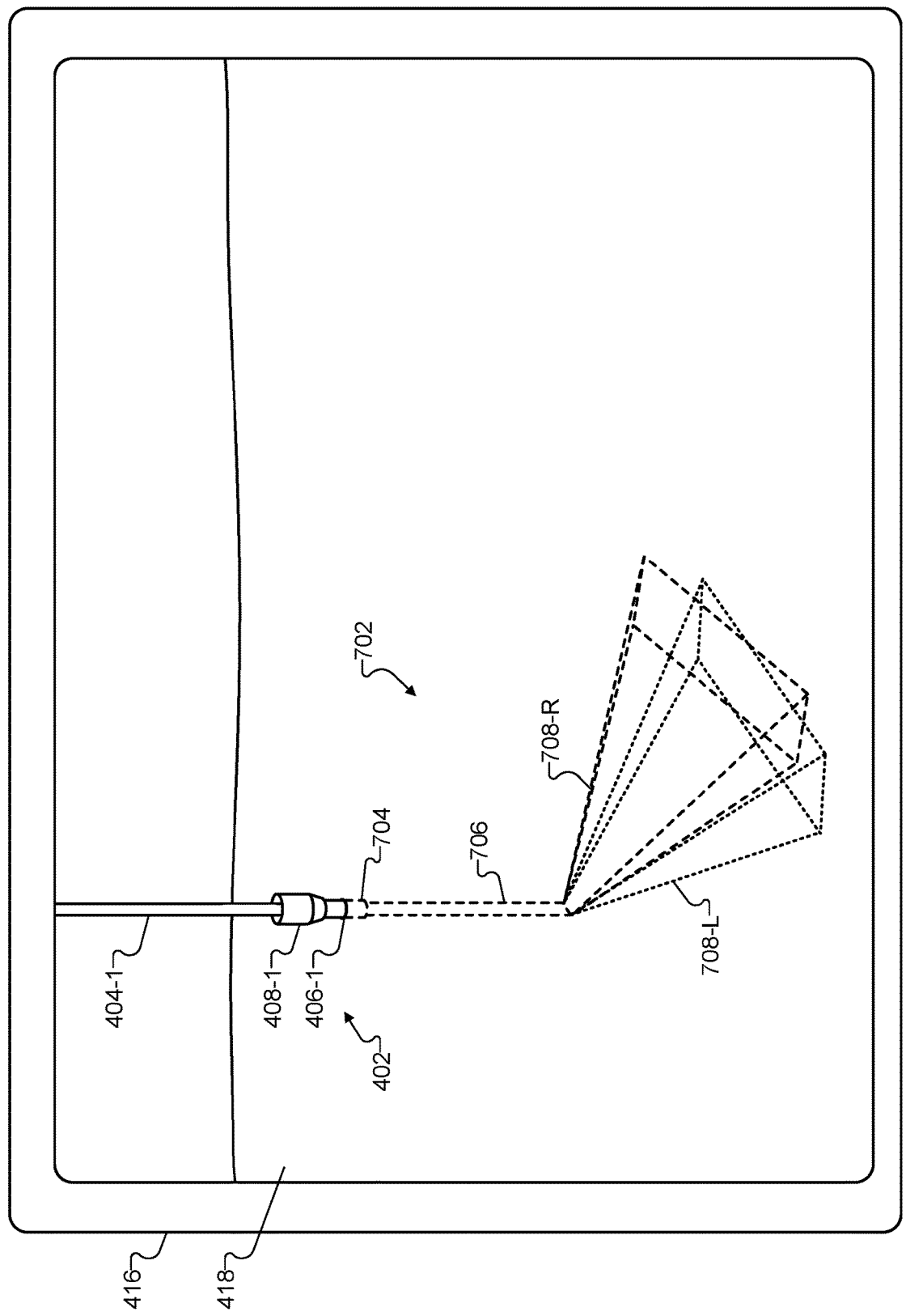
FIGS. 7-10 illustrate an exemplary display device displaying different exemplary shape overlays together with an exemplary external view of a body according to principles described herein.
Figure 8:
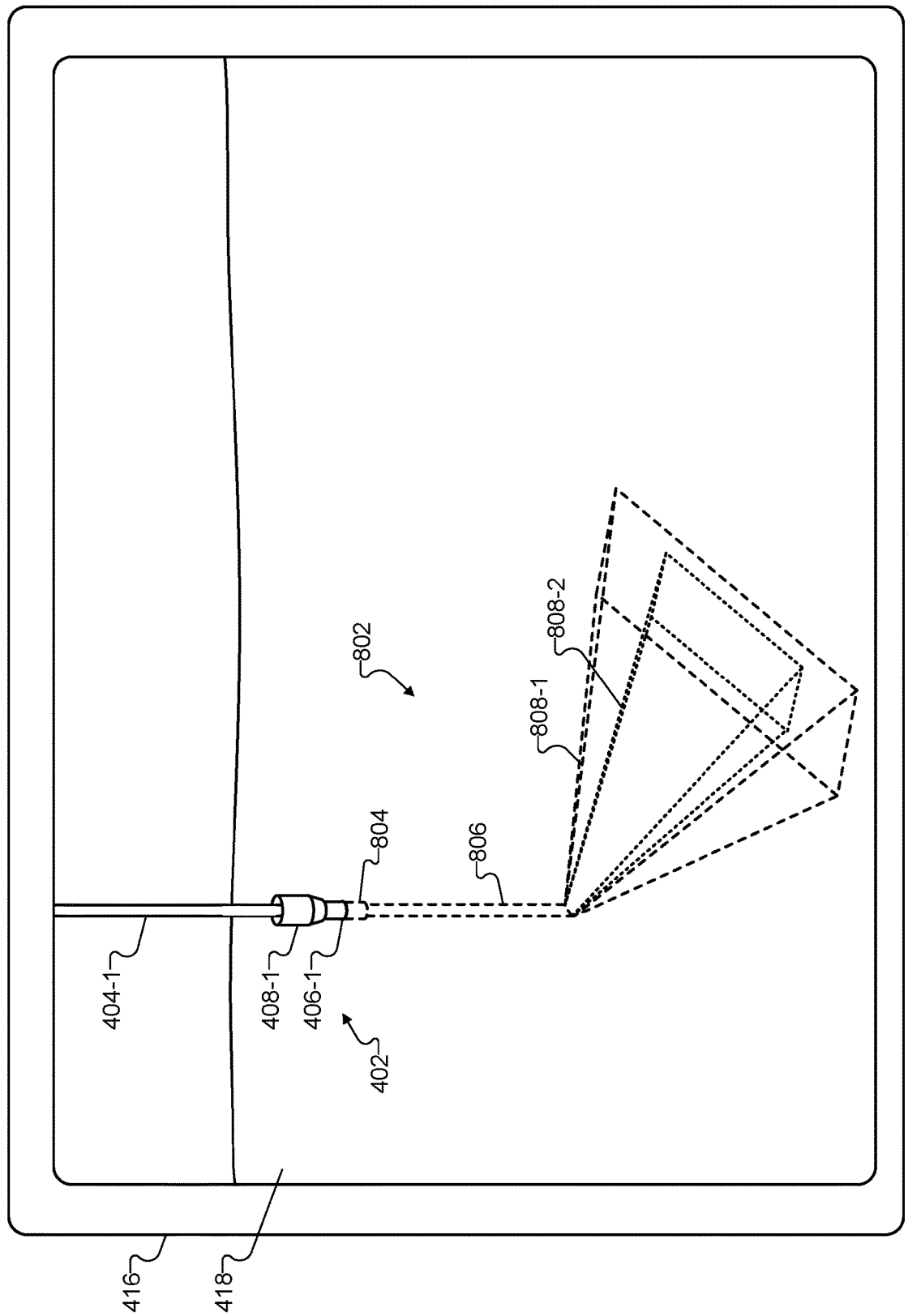
Figure 9:
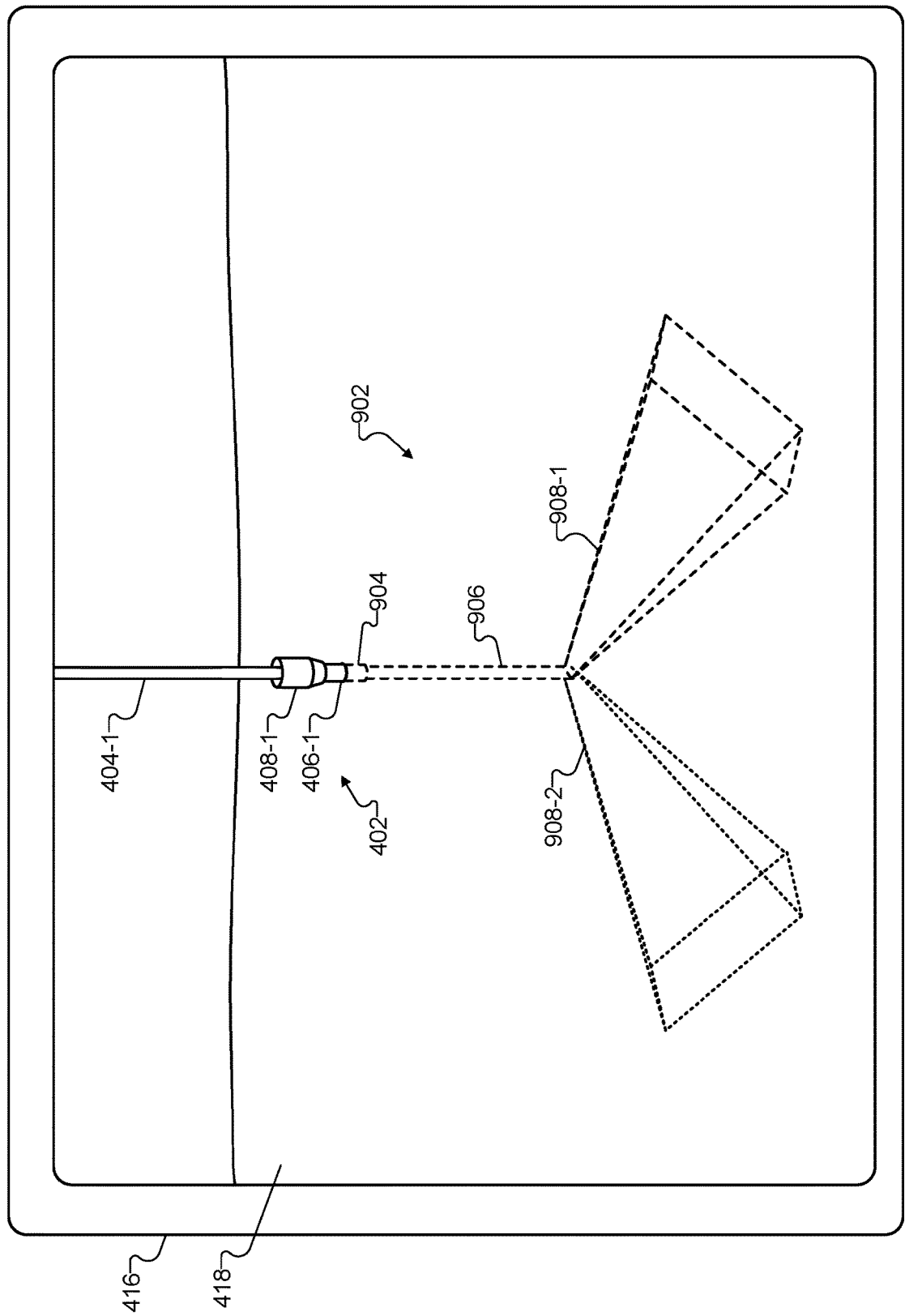
Figure 10:
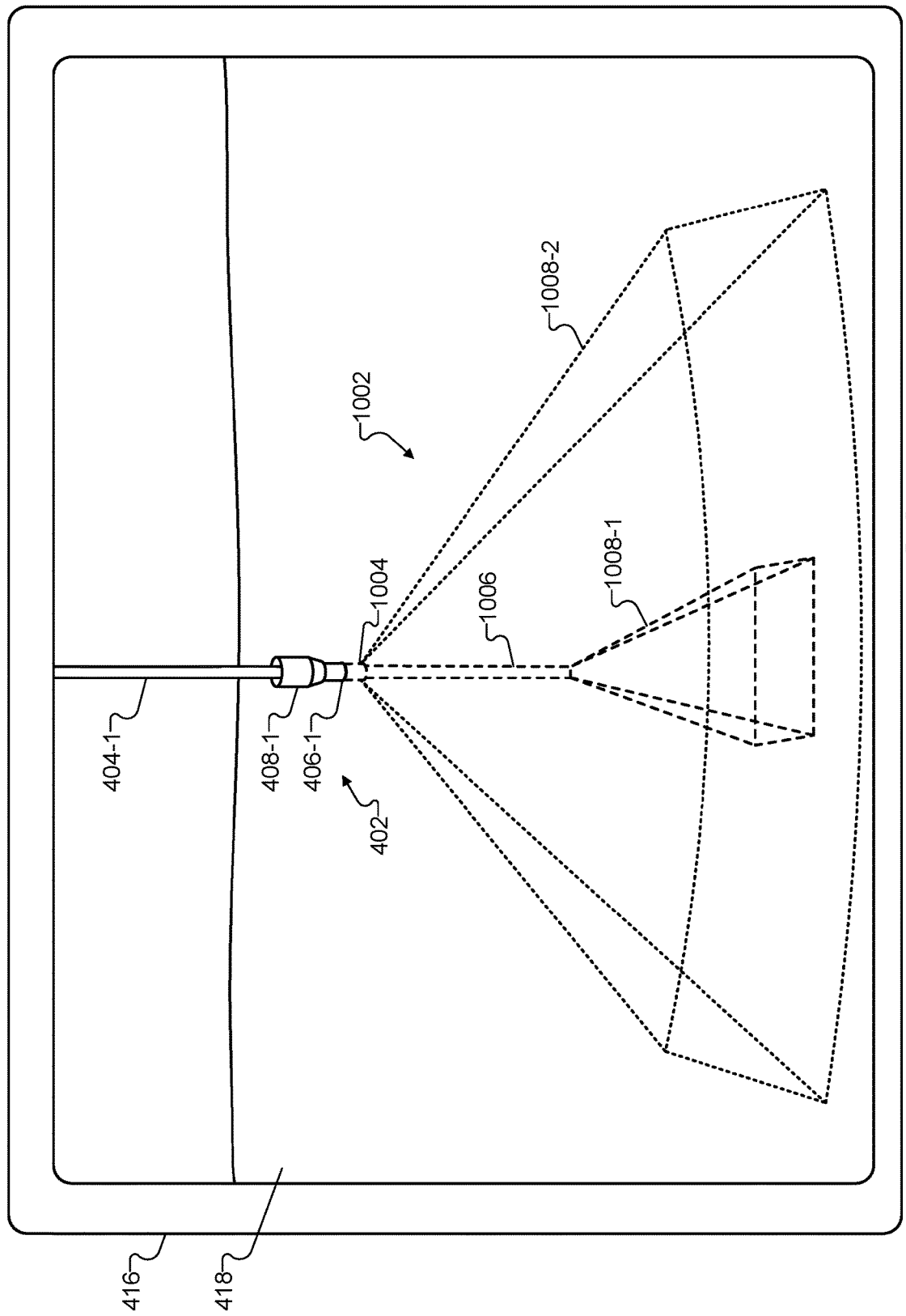

As further shown in each of FIGS. 7-10, mixed reality presentation 418 includes, along with the real elements of external view 402, different shape overlays each including one or more virtual elements. Specifically, FIG. 7 shows a shape overlay 702, FIG. 8 shows a shape overlay 802, FIG. 9 shows a shape overlay 902, and FIG. 10 shows a shape overlay 1002. Each of these shape overlays will be described in more detail below and will be understood to be different exemplary implementations of shape overlay 420, described above. As depicted in FIGS. 7-10, each of the virtual elements of the respective shape overlays are drawn with dashed or dotted lines. As mentioned above and as shown, the virtual elements of the shape overlays are displayed on display device 416 so as to be integrated with external view 402 (i.e., so as to overlap and appear to be integrated with the real elements of external view 402).

FIG. 7 shows shape overlay 702, which depicts a virtual portion 704 of cannula 408-1, a virtual portion 706 of active imaging device 404-1, and at least one of two shapes 708 (i.e., shapes 708-R and 708-L). Either or both of shapes 708 may be displayed to help indicate the extent of the field of view of active imaging device 404-1 relative to the body in an example in which active imaging device 404-1 is implemented as a stereoscopic imaging device.

Virtual portions 704 and 706 may represent portions of cannula 408-1 and active imaging device 404-1, respectively, that are not visible in external view 402. For example, the represented portions of cannula 408-1 and active imaging device 404-1 may not be visible due to having been inserted into the body at port 406-1 so as to be located beneath the external surface of the body (e.g., the skin).

As mentioned above, a monoscopic active imaging device may be associated with a single field of view, and may thus include only a single possibility for a shape to be depicted in a shape overlay for any given configuration (e.g., any given articulation configuration, zoom level configuration, etc.). However, because in this example active imaging device 404-1 is a stereoscopic imaging device, there are more possibilities for shapes that may be depicted in shape overlay 702. For instance, system 100 may, in some examples, allow a user to manually select whether shape overlay 702 displays shape 708-R corresponding to the right-side field of view, shape 708-L corresponding to the left-side field of view, both shapes 708, or some combination of shapes 708 as will be described below. System 100 may display such options, for example, on a user interface of auxiliary system 206 and receive user input representative of a user preference, for example.

Additionally or alternatively, it may be desirable for system 100 to display shape overlay 702 to automatically correspond to what is being displayed elsewhere within medical system 200 (e.g., on display monitor 214 of auxiliary system 206, on a display device associated with user control system 204, etc.). To this end, system 100 may determine a device-specific parameter for active imaging device 404-1 that indicates that active imaging device 404-1 is a stereoscopic imaging device that includes a first image sensor configured to capture the imagery of the body from a first vantage point, and a second image sensor configured to capture the imagery of the body from a second vantage point. System 100 may then direct display device 416 to display shape overlay 702 together with external view 402 based on which one or both of the first and second image sensors is actively providing the imagery for presentation to the user.

For instance, in some cases, system 100 may detect that only the first image sensor (e.g., the right-side image sensor) is actively providing the imagery for the presentation to the user and, as a result, may direct display device 416 to display shape overlay 702 together with external view 402 by directing display device 416 to display shape overlay 702 to correspond to the first image sensor (e.g., to only depict shape 708-R). This scenario may occur, for example, if the user is assistant 210-2 who may be referring to a monoscopic internal view of the body (e.g., by way of display monitor 214 of auxiliary system 206) and may desire that the displayed shape overlay correspond to whichever of the left- or right-side internal view is currently presented on display monitor 214.

In other cases, system 100 may detect that both the first and second image sensors are actively providing the imagery for the presentation to the user and, as a result, may direct display device 416 to display shape overlay 702 together with external view 402 by directing display device 416 to display shape overlay 702 to correspond to both the first and second image sensors. This scenario may occur, for example, if the user (e.g., clinician 210-1, assistant 210-2, etc.) is referring to a stereoscopic internal view of the body (e.g., by way of user control system 204, by way of a 3D display monitor 214 of auxiliary system 206, etc.).

In these cases, system 100 may direct display device 416 to display both shapes 708 or a combination of shapes 708. One possible such combination, for instance, may be a shape that indicates an overlap between a field of view corresponding to the first image sensor and a field of view corresponding to the second image sensor. In other words, a shape corresponding to the area covered by both shape 708-R and 708-L may be used. Such a shape would correspond to an area that clinician 210-1 sees in 3D, and thus may be an area in which it is desirable to insert new instruments or supplies to make them easy for clinician 210-1 to see and work with. Alternatively, another possible such combination may be a shape that indicates an aggregation of a field of view corresponding to the first image sensor and a field of view corresponding to the second image sensor. In other words, a shape corresponding to the area covered by either shape 708-R or 708-L may be used. Such a shape would correspond to a full extent of the area where the clinician 210-1 can see anything at all (i.e., with either or both eyes), and thus may be an area in which it is desirable to insert new instruments or supplies that may be difficult to insert into the 3D region of the surgeon's view for various reasons (e.g., because there is an awkward insertion angle that makes it difficult to insert the instrument into the center of the surgeon's view, etc.).

In certain scenarios, it may be useful for a user to view a shape overlay representative of an extent of a field of view other than the current field of view of the active imaging device. For instance, in one example a user may wish to preview, during a preoperative phase of a medical procedure (e.g., before the operation begins and the active imaging device begin capturing imagery), a field of view with which imagery will be captured if a particular imaging device is used in a particular port. As another example, during an intraoperative phase of the medical procedure, the user may consider changing an aspect of the active imaging device (e.g., altering a setting of the active imaging device, altering the pose of the active imaging device, swapping out the active imaging device for a different imaging device, moving the active imaging device to a different port, etc.), but may wish to preview how such a change would affect the field of view with which imagery of the internal view is being captured. Being presented with such previews of potential fields of view may be valuable to users because it may be time-consuming and inconvenient to swap out imaging devices and/or alter settings. As a result of this inconvenience, it may be desirable to be able to visualize projected results of such changes before effecting the changes.

System 100 may facilitate the presentation of various types of previews for various scenarios in any suitable manner. For instance, system 100 may determine (e.g., based on imaging device data 608 received from active imaging device 404-1, as described above) an additional device-specific parameter characterizing an extent of a potential field of view of the active imaging device. Based on the additional device-specific parameter, system 100 may direct display device 416 to display, together with external view 402, a potential shape overlay indicative of the extent of the potential field of view, relative to the body, of active imaging device 404-1.

For instance, as one example illustrated by FIG. 7, the additional device-specific parameter may characterize active imaging device 404-1 as a stereoscopic imaging device. In this example, the current shape overlay may depict shape 708-R alone based on a current setting, and the potential shape overlay may depict (e.g., as a preview of what would happen if the setting were to be changed to display the left-side image on the 2D display monitor 214) either shape 708-L alone or both of shapes 708-L and 708-R together (as shown in FIG. 7).

As another example, FIG. 8 shows a shape overlay 802 that depicts virtual portions 804 and 806 that, like virtual portions 704 and 706, represent unviewable (occluded) portions of cannula 408-1 and active imaging device 404-1, as well as shapes 808 (i.e., shapes 808-1 and 808-2). As illustrated by FIG. 8, system 100 may present a preview of a change in a mode or imaging technology being employed by active imaging device 404-1 (e.g., whether active imaging device 404-1 is operating in a standard mode, fluorescence imaging mode, a motion amplification mode, a hyperspectral imaging mode, etc.). Specifically, active imaging device 404-1 may be configured to capture the imagery of the internal view by way of one imaging technology at a time from a plurality of imaging technologies supported by the active imaging device (e.g., including any imaging technologies described herein or as may serve a particular implementation). System 100 may thus direct display device 416 to display shape overlay 802 to depict, instead of or in addition to shape 808-1 indicative of a field of view corresponding to a first imaging technology in the plurality of imaging technologies, shape 808-2 indicative of the potential field of view corresponding to a second imaging technology in the plurality of imaging technologies that is distinct from the first imaging technology.

As shown in FIG. 8, shape 808-1 may indicate a current field of view using a current imaging technology, while shape 808-2 may be a preview indicating a potential field of view using a different imaging technology. As described above in relation to FIG. 7, it will be understood that shape overlay 802 may depict only one of shapes 808 at a time, or may depict both shapes 808 concurrently. Additionally, it will be understood that the respective fields of view indicated by shapes 808 may represent fields of view associated with changing settings other than a setting related to imaging technologies. For example, in one implementation, shape 808-1 may indicate a current field of view associated with a current zoom level, while shape 808-2 may be a preview indicating a potential field of view associated with a different zoom level (e.g., a maximum zoom level, a minimum zoom level, or another arbitrary zoom level that is available). Other imaging device settings that may affect the field of view may also be previewed in a similar way as may serve a particular implementation.

FIG. 9 shows another exemplary shape overlay 902 that may be presented under direction of system 100. Shape overlay 902 depicts virtual portions 904 and 906 that, like corresponding virtual portions in FIGS. 7 and 8, also represent unviewable (occluded) portions of cannula 408-1 and active imaging device 404-1, respectively. Shape overlay 902 may further depict either or both of shapes 908 (i.e., shapes 908-1 and 908-2). In this case, shape 908-1 may indicate a current field of view for a manner in which active imaging device 404-1 is currently angled, oriented, articulated, or the like. Shape 908-2 may indicate a potential field of view indicative of a potential field of view for a second manner in which active imaging device 404-1 may potentially be angled, oriented, and/or articulated (e.g., after a setting is changed on active imaging device 404-1, after active imaging device 404-1 is moved or reoriented, etc.). As described above in relation to FIGS. 7 and 8, it will be understood that shape overlay 902 may depict only one of shapes 908 at a time, or may depict both shapes 908 concurrently.

FIG. 10 shows another exemplary overlay 1002 that may be presented under direction of system 100. Shape overlay 1002 depicts virtual portions 1004 and 1006 that, like corresponding virtual portions in FIGS. 7 through 9, also represent unviewable (occluded) portions of cannula 408-1 and active imaging device 404-1, respectively. Shape overlay 1002 may further depict either or both of shapes 1008 (i.e., shapes 1008-1 and 1008-2). In this case, shape 1008-1 may indicate a current field of view for a current location of active imaging device 404-1. Shape 1008-2 may indicate a potential field of view indicative of a potential field of view for a different location of active imaging device 404-1 (e.g., a position right at the mouth of cannula 408-1). In some examples, an optical zoom of active imaging device 404-1 may be implemented by physically moving active imaging device 404-1 to different depth within an operational area. Thus, shape 1008-2 may represent a preview of a widest angle or optical zoom level possible (i.e., a minimum optical zoom level) for active imaging device 404-1. Additionally, shape indicative of a maximum optical zoom level could similarly be depicted (not explicitly shown in FIG. 10). As described above in relation to FIGS. 7 through 9, it will be understood that shape overlay 1002 may depict only one of shapes 1008 at a time, or may depict both shapes 1008 concurrently.

It will be understood that for shape overlay 1002 and each of the other shape overlays described herein, the virtual portions (e.g., virtual portions 1004 and 1006 or other corresponding virtual portions in other figures) are displayed optionally and may be omitted such that the shape overlay depicts only one or more shapes.

Additionally, while various examples described in FIGS. 7-10 have focused on previewing changes to active imaging device 404-1, it will be understood that system 100 may direct display device 416 to display other shape overlays associated with other fields of view as may serve a particular implementation. As one example, in addition or as an alternative to showing a shape overlay corresponding to a current level of insertion of active imaging device 404-1, system 100 may direct display device 416 to display a shape overlay corresponding to a minimum level of insertion (e.g., in which the distal end of active imaging device 404-1 is positioned at the mouth of cannula 408-1). Such a shape overlay may facilitate user adjustment of the insertion level of active imaging device 404-1 as instruments or supplies are inserted into the operational area. As another example, two or more active imaging devices may be employed together during the performance of a single operation, and system 100 may direct display device 416 to display respective shape overlays corresponding to both active imaging devices. In this example, the respective shape overlays may be distinct from one another and may be differentiated in any suitable way (e.g., by different colors, highlighting, line styles, transparencies, etc.).

As yet another example, projected changes to a field of view may be previewed for an imaging device other than an active imaging device (e.g., in cases where it may be desirable to swap out active imaging device 404-1 for a different imaging device). For instance, rather than determining an additional device-specific parameter characterizing the extent of the potential field of view of active imaging device 404-1, system 100 may determine an additional device-specific parameter characterizing an extent of a potential field of view of a non-active imaging device that is being considered as a replacement for active imaging device 404-1.

Like active imaging device 404-1, the non-active imaging device may be configured to capture imagery of the internal view of the body. However, the non-active imaging device may be characterized by different parameters that may allow the non-active imaging device to capture imagery of the internal view using different potential fields of view. Accordingly, based on the additional device-specific parameter for the non-active imaging device and the spatial pose of the active imaging device, system 100 may direct display device 416 to display, together with external view 402 and in place of the shape overlay corresponding to active imaging device 404-1, a potential shape overlay indicative of the extent of the potential field of view of the non-active imaging device relative to the body. For example, the shape overlay corresponding to active imaging device 404-1 may be one of the shape overlays shown in FIGS. 7-10 that may depict only one of the shapes illustrated therewith (e.g., only shape 708-1, 808-1, 908-1, 1008-1, etc.). The potential shape overlay indicative of the extent of the potential field of view of the non-active imaging device may then depict the other one of the shapes illustrated in FIGS. 7-10 (e.g., shapes 708-2, 808-2, 908-2, 1008-2, etc.) together with or instead of the first shape associated with active imaging device 404-1.

When system 100 directs display device 416 to display a shape overlay within a mixed reality presentation, the position, orientation, shape, features, and various other aspects of the shape depicted in the shape overlay may be displayed based on device-specific parameters of the active imaging device, the current pose of the active imaging device, and other such factors as have been described. While defining various aspects of how the shape should be depicted within the shape overlay, however, these factors may not necessarily define a height characteristic of the shape. As used herein, a height of a shape included within a shape overlay may refer to a distance from a point or face where the shape originates (e.g., face of origination 502 for the shape depicted by shape overlay 500-A, point of origination 506 for the shape depicted by shape overlay 500-B, etc.) to a base of the shape (e.g., base 504-1 of the shape depicted in shape overlay 500-A, base 504-2 for the shape depicted in shape overlay 500-B, etc.). Because an appropriate height for the shape may not be defined by device-specific parameters or pose characteristics of the active imaging device, the height of a shape depicted in a particular shape overlay may be determined in other ways, as will now be described.

In certain implementations, system 100 may direct the height of the shape depicted in a shape overlay to be based on a predetermined setting (e.g., a preset depth setting, a preselected user preference setting, etc.). This height may remain static for the shape overlay and/or other shape overlays displayed under direction of such an implementation of system 100. In other implementations, system 100 may direct the height of the shape depicted in the shape overlay to be determined dynamically and/or to be more customized or customizable to user preferences, the context of a particular operation, or other operating conditions. For instance, system 100 may be configured to receive user input from a user of display device 416. The user input may be indicative of a preference of the user with respect to at least one of a height and a display mode for a shape depicted in the shape overlay displayed together with the external view of the body. As a result, system 100 may direct the display device to display the shape depicted in the shape overlay in accordance with the preference of the user as determined based on the received user input.

The user input received by system 100 is this type of implementation may representative of different types of user preferences. For instance, in one example, the user may indicate that he or she prefers to dynamically change the height of a shape so as to make the shape taller (e.g., because it is currently too short to easily see, because the extent of the field of view is important for a task the user is currently engaged with, etc.), to make the shape shorter (e.g., because it is currently occluding the user from seeing other important things in the external view, because it is distracting and not important to any task the user is currently engaged with, etc.), or to activate or deactivate the shape overlay altogether. In another example, the user input may indicate a user preference for a display mode in which height is not indicated at all. Specifically, system 100 may direct display device 416 to display a shape overlay with at least a portion that is partially transparent (i.e., such that the external view is partially viewable through the shape overlay when the shape overlay is displayed together with the external view). A shape depicted in such a partially transparent shape overlay may lack a base that is viewable over the external view when the shape overlay is displayed together with the external view. For instance, the shape may begin as being completely or relatively opaque near the face or point of origination, and may then grow increasingly transparent toward the opposite side until completely fading from view prior to reaching a base of the shape. In yet another example, the user input may indicate a user preference for the height to be automatically adjusted based on how close the user is to the display screen, or other suitable factors as may serve a particular implementation.

Whether in response to a preconfigured setting or to dynamic input received from a user, system 100 may be configured, in certain implementations, to display a shape having a height indicative of a position of an anatomical or other internal surface in the operational area. This feature may facilitate the user in inserting instruments and/or other supplies into the operational area. For example, by indicating the position of an anatomical surface (and thereby differentiating non-empty space filled with tissue from open space of the operational area), system 100 may enable the user to avoid inserting an object behind the surface at a location that clinician 210-1 may not be able to view and/or that may not be part of the operational area. To the contrary, if the height of a shape is indicative of the position of the anatomical surface (e.g., by the anatomical surface being aligned with a base, cross section, or other conspicuous feature of the shape), it may be relatively easy for the user to visualize where open space of the operational area is located and to introduce an instrument into that open space.

Figure 11:
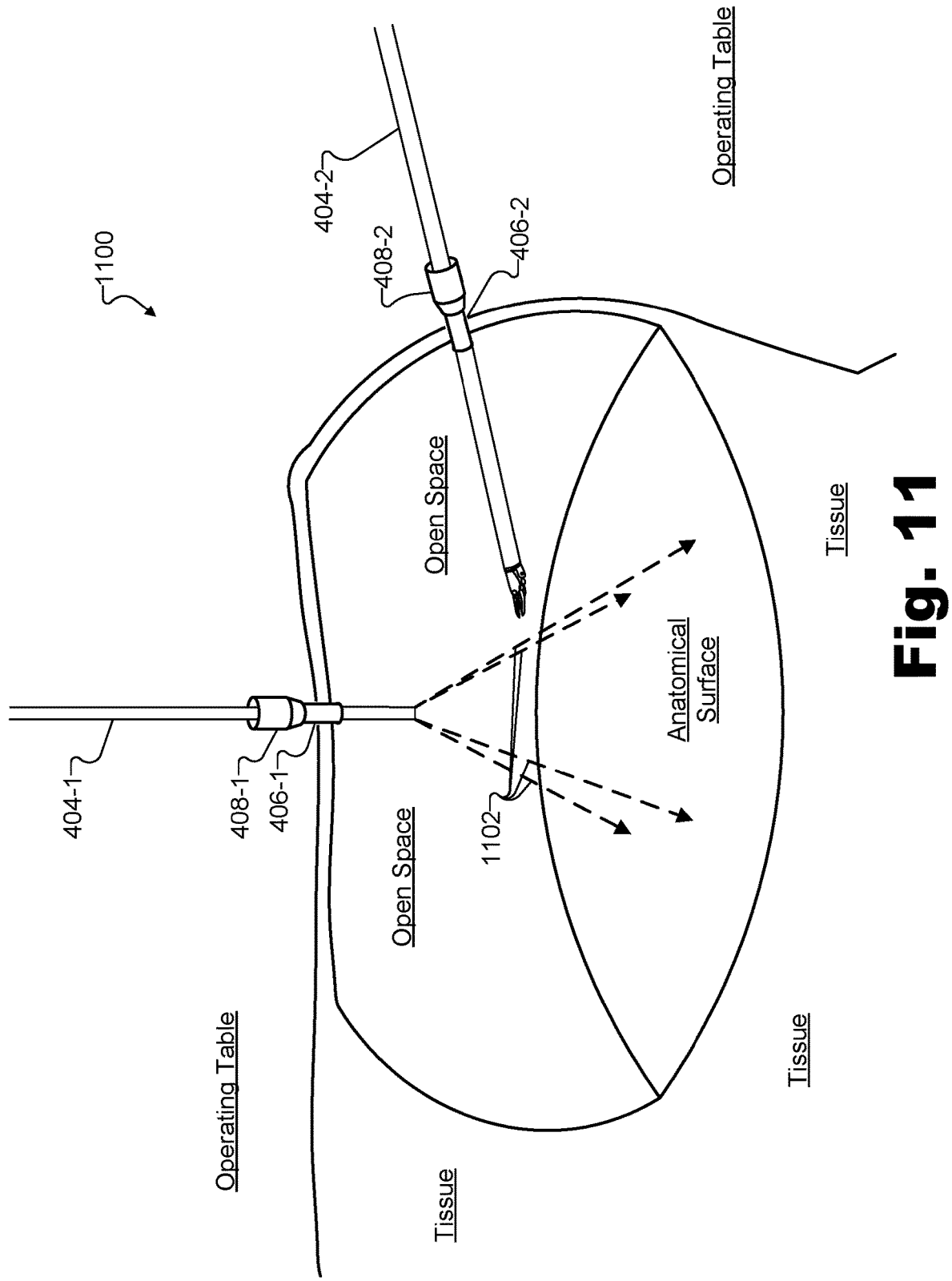
FIG. 11 illustrates a cutaway view of an exemplary operational area into which an instrument is being inserted according to principles described herein.

To illustrate, FIG. 11 shows a cutaway view 1100 of an exemplary operational area into which instrument 404-2 is being inserted by way of cannula 408-2 at port 406-2. As shown, and as mentioned above, instrument 404-2 may be a different type of instrument than active imaging device 404-1. Specifically, rather than being used for capturing imagery of the operational area like active imaging device 404-1, instrument 404-2 may be used to manipulate tissue and/or to otherwise help perform a medical procedure under the view of active imaging device 404-1. As such, it may be desirable for a user tasked with introducing instrument 404-2 into the operational area to insert instrument 404-2 into open space of the operational area (i.e., rather than into tissue outside of the operational area), and, more particularly, into a field of view 1102 of active imaging device 404-1 such that clinician 210-1 will have visibility of instrument 404-2 as he or she uses the instrument to perform the operation.

To this end, system 100 may be configured to determine a depth, relative to active imaging device 404-1, of the anatomical surface depicted in the imagery captured by active imaging device 404-1 of the internal view of the body. This anatomical surface is illustrated and labeled in FIG. 11. As shown, by determining the depth of the anatomical surface, system 100 may be apprised of the spatial location of the anatomical surface and where the open space of the operational area ends and the tissue begins. Accordingly, system 100 may direct a shape overlay that is displayed together with the external view of the body to be indicative of the depth of the anatomical surface so as inform the user, at a glance, exactly where the open space is and where the tissue is in the operational area. For example, the shape overlay may indicate the depth by making the height of the shape equal to the depth.

Figure 12:
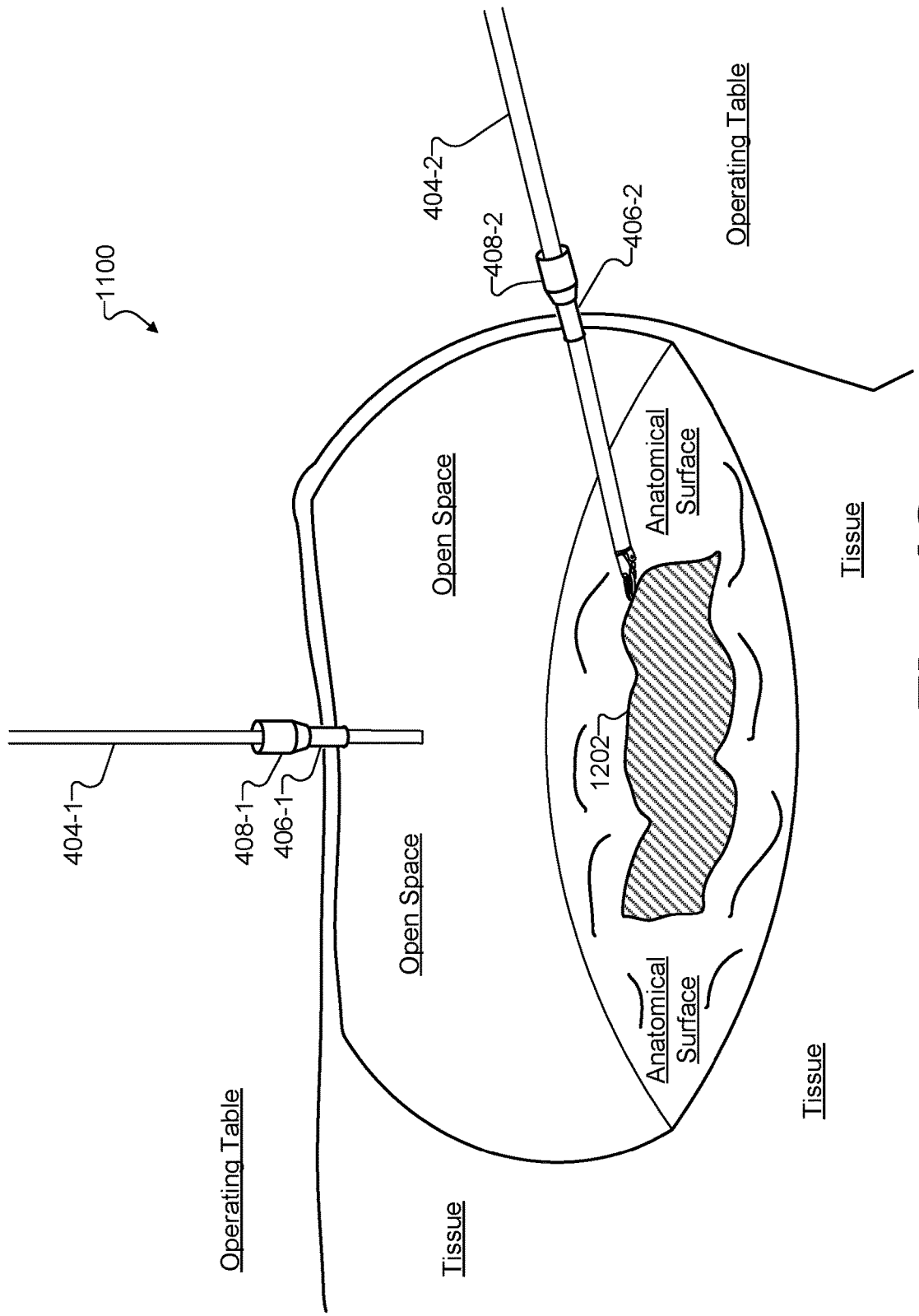
FIG. 12 illustrates an exemplary depth map representative of depth contours of an anatomical surface according to principles described herein.

FIG. 12 illustrates an exemplary depth map 1202 representative of depth contours of the anatomical surface as detected by system 100. Depth map 1202 may be determined and represented in any suitable way. For instance, in some implementations, imagery captured by active imaging device 404-1 may be used to determine and provide depth data representative of the anatomical surface, or to provide image data that may be processed to derive such depth data. For example, active imaging device 404-1 may capture and provide images of the anatomical surface that represent depth sensed by imaging device 404-1. Alternatively, active imaging device 404-1 may capture images of the anatomical surface that may be processed to derive depth data for the anatomical surface in the operational area. For example, stereoscopic images depicting the anatomical surface may be processed to determine depth map 1202 based on difference between the stereoscopic images. Depth map 1202 may be implemented as a data representation of the anatomical surface obtained using a Z-buffer that indicates distance from imaging device 404-1 to each pixel in the representation. Depth map 1202 may be configured to indicate depths of objects in any suitable way, such as by using different greyscale values to represent different depth values or by any other technique as may serve a particular implementation.

In other implementations, depth map 1202 may be determined based on kinematic data associated with instruments being employed to perform the operation on the anatomical surface (e.g., such as instrument 404-2). For example, system 100 may process raw kinematic data under an assumption that, as instruments have been manipulated within the operational area, the instruments have approached and touched the anatomical surface without going significantly beyond the surface. Thus, at least insofar as this assumption remains valid, kinematic data representative of the position (e.g., the current position and/or past positions) of the instrument may provide relatively accurate and detailed information upon which depth map 1202 may be based. In still other examples, depth map 1202 may be determined in other ways as may serve a particular implementation.

System 100 may determine depth map 1202, as well as the extent of field of view 1102 with respect to the body, in any of the ways described herein. Once the extent and the depth map have been determined, system 100 may direct the display device to display a shape overlay that is indicative of both the extent of the field of view and the depth of the anatomical surface.

Figure 13:
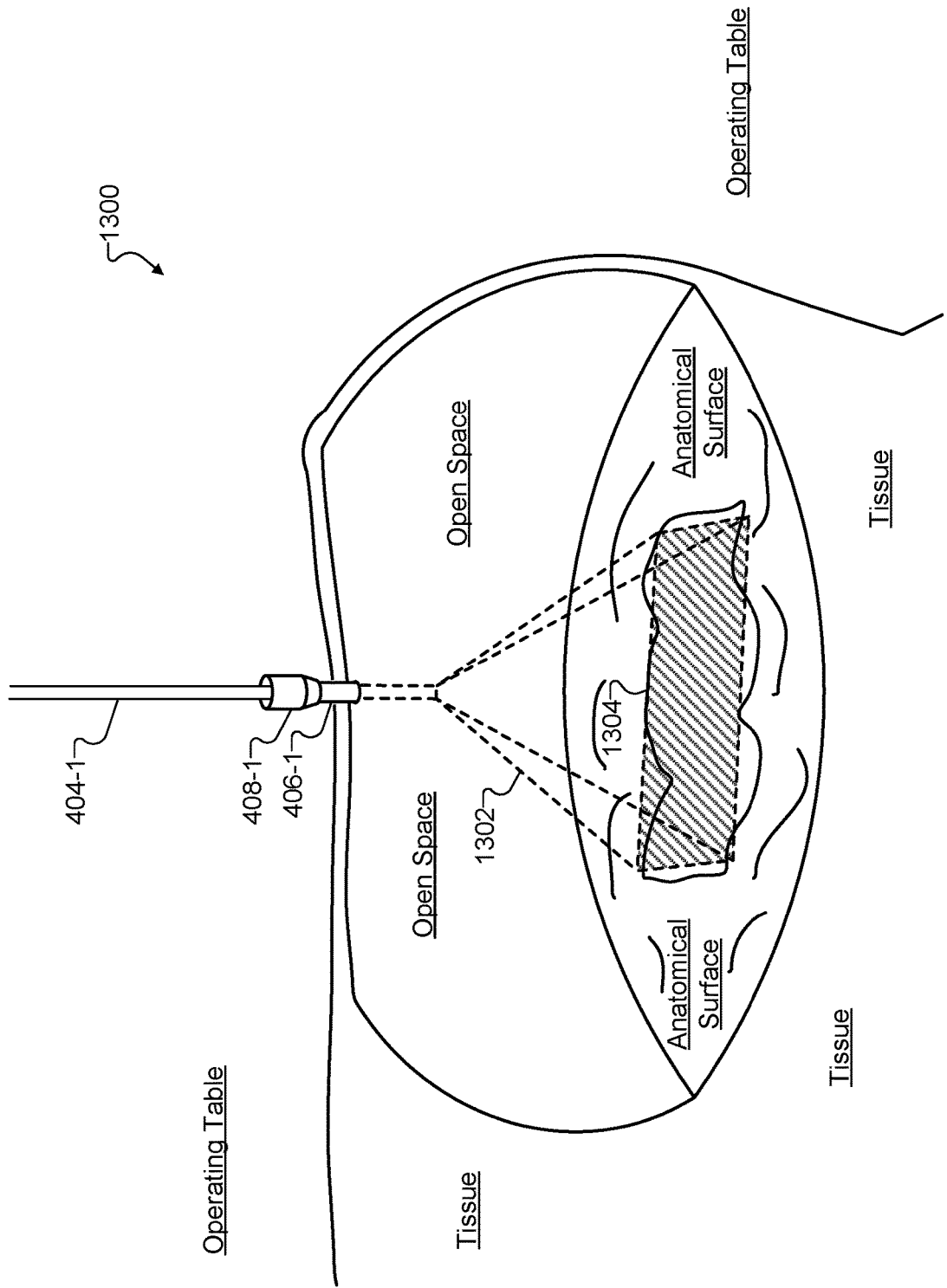
FIGS. 13-14 illustrate a hybrid view depicting the cutaway view of FIG. 11 with different virtual shape overlays according to principles described herein.
Figure 14:
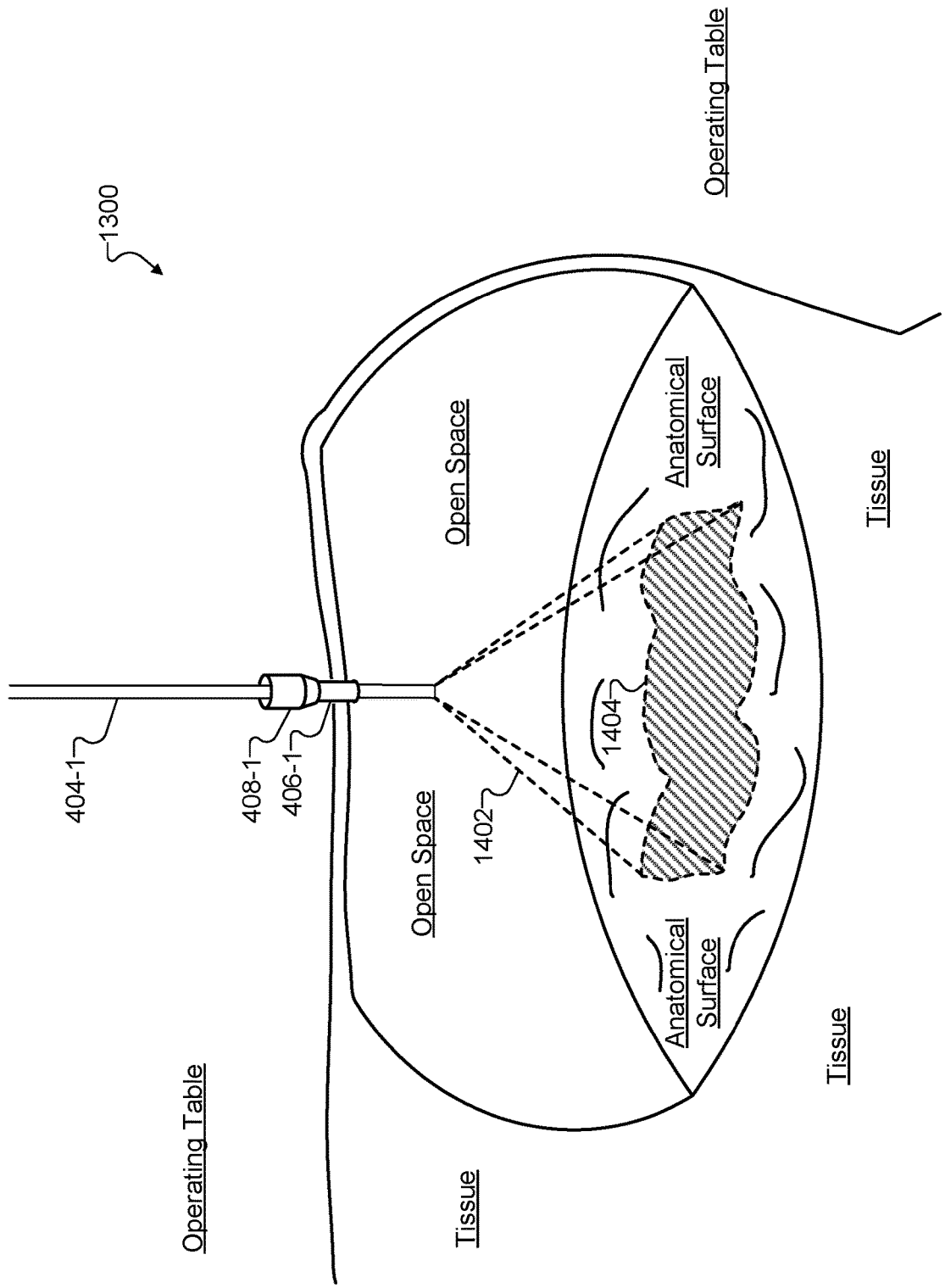

To illustrate, FIGS. 13-14 illustrate a hybrid view 1300 that combines cutaway view 1100 with different exemplary shape overlays depicting shapes with different exemplary bases indicative of the depth of the anatomical surface. Hybrid view 1300 is "hybrid" in the sense that it combines aspects of a mixed reality presentation drawing (such as shown in FIGS. 7 through 10) with aspects of a cutaway view drawing (such as shown in FIGS. 11 and 12). For example, while the open space and the anatomical surface would not normally be visible in a mixed reality presentation (i.e., because these are internal and not visible from the external view), neither would a virtual shape overlay normally be visible in a cutaway view of the body. Hybrid view 1300 is useful for illustrative purposes, however, because it shows, in a single view, the relationship (e.g., the alignment) between a shape overlay and an anatomical surface. For example, hybrid view 1300 allows an alignment between an anatomical surface of an operational area and a base of a shape depicted by the shape overlay to be illustrated.

FIG. 13 shows a first example of how a shape overlay 1302 that depicts a shape with a base 1304 may align with an anatomical surface. As shown in FIG. 13, base 1304 may be a planar face of the shape depicted in shape overlay 1302, and may thus be referred to herein as a planar base.

Base 1304 may be positioned to indicate the depth of the anatomical surface in any manner as may serve a particular implementation. For example, the depth of the anatomical surface with which base 1304 is aligned may be an average depth of a portion of the anatomical surface (e.g., the portion that falls within the field of view), a minimum depth of the portion of the anatomical surface, a maximum depth of the portion of the anatomical surface, or any other suitable depth of that portion. Regardless of which type of depth is represented, shape overlay 1302 may be indicative of the depth by depicting a shape with a planar base (e.g., base 1304) or planar cross section that is displayed together with the external view of the body such that the planar base or planar cross section appears to be located at the depth of the portion of the anatomical surface.

FIG. 14 illustrates another example of how a shape overlay 1402 that depicts a shape with a base 1404 may align with the anatomical surface. As shown in FIG. 14, base 1404 may be a contoured face of the shape depicted in shape overlay 1402, and may thus be referred to herein as a contoured base.

Base 1404 may be positioned and oriented to indicate not only a single depth of the anatomical surface, but to further illustrate depth contours of the anatomical surface (e.g., based on details of depth map 1202). Accordingly, in this example, the depth of the anatomical surface with which base 1404 is aligned may be a depth map representing depth contours of a portion of the anatomical surface (e.g., the portion that falls within the field of view). As shown, shape overlay 1402 may be indicative of the depth of the anatomical surface by depicting a shape with a non-planar base (e.g., base 1404) or non-planar cross section (e.g., a contoured base or contoured cross section) displayed together with the external view of the body such that the non-planar base or non-planar cross section appears to conform to the depth contours of the portion of the anatomical surface based on the depth map.

While respective bases 1304 and 1404 are used in FIGS. 13 and 14 to indicate the depth of the anatomical surface, it will be understood that a shape overlay may indicate the depth in any manner as may serve a particular implementation. For instance, rather than directing a display device to depict a planar or contoured base of a shape, system 100 may instead direct the display device to depict a planar or contoured cross section of the shape. In other examples, other visual indications associated with the shape may perform similar functions. For instance, depth may be indicated by way of a marking drawn on the shape, by way of a color or line style change on the shape, by way of a change in transparency on the shape, by way of any other suitable visual indication.

In certain examples, system 100 may display a shape overlay before any depth data has been accessed or become available for the system to use. For instance, it may take time to generate a suitably detailed depth map (e.g., as instruments are moved in the operational area and kinematic data is collected, as a sufficient number of stereoscopic images are detected and analyzed, etc.) or a depth detection error or issue may occur. In certain implementations, depth data may not be detected at all. Regardless, if depth information is not known to system 100, it may be desirable to show the extent (e.g., the pose, shape, and other such aspects) of the field of view without also showing a base that may falsely imply a location of an anatomical surface where no such surface has been detected to be located. To this end, system 100 may indicate that the depth is unknown by directing the display device to display a shape overlay having a different color or line style, by displaying a partially transparent shape overlay that does not depict a visible base such as described above, or by indicating that the depth is unavailable in any other manner as may serve a particular implementation.

Figure 15:
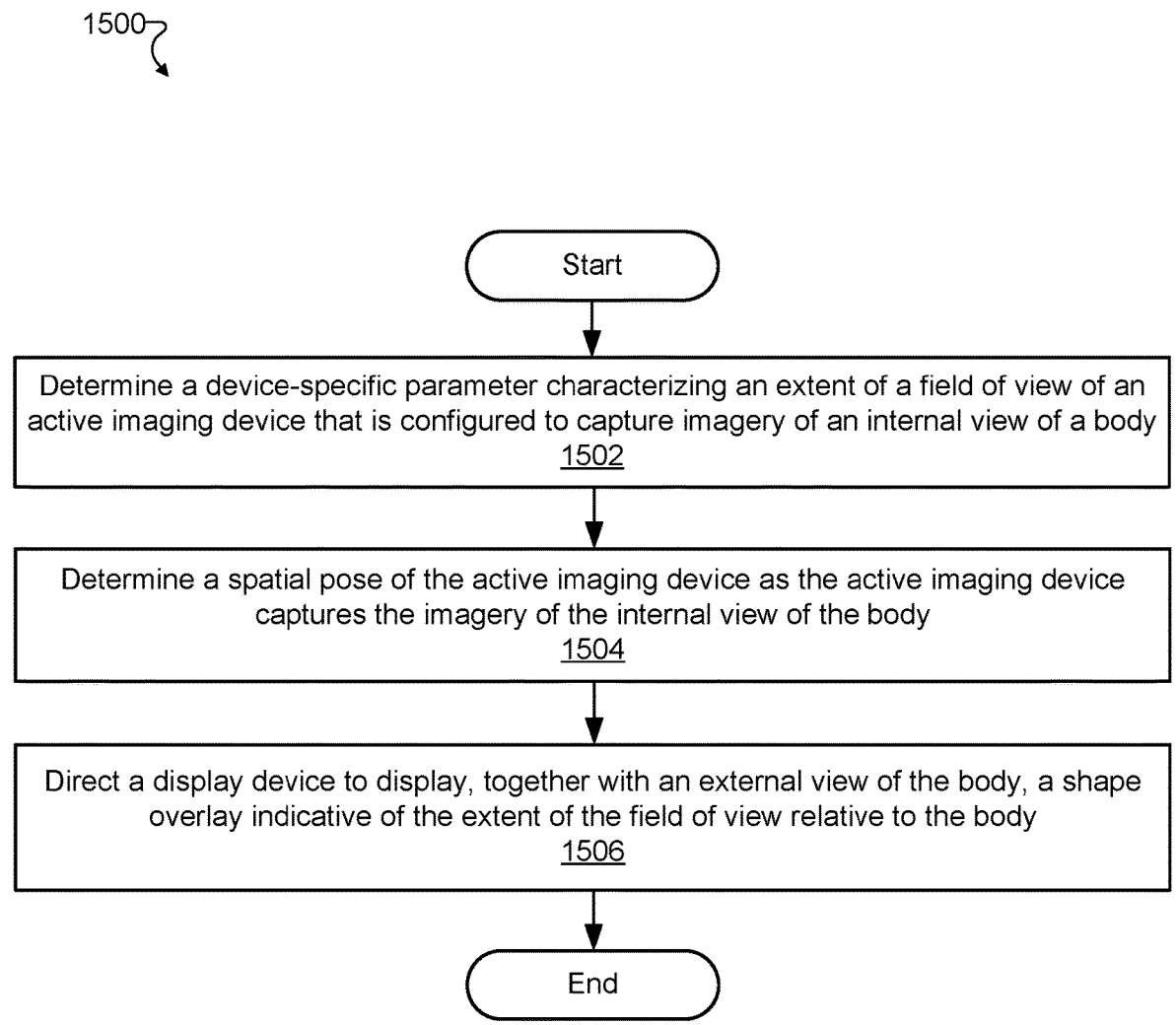
FIG. 15 illustrates an exemplary mixed reality method for indicating an extent of a field of view of an imaging device according to principles described herein.

FIG. 15 illustrates an exemplary method 1500 for indicating an extent of a field of view of an imaging device. While FIG. 15 illustrates exemplary operations according to one embodiment, other embodiments may omit, add to, reorder, and/or modify any of the operations shown in FIG. 15. One or more of the operations shown in FIG. 15 may be performed by a mixed reality presentation system such as system 100, any components included therein, and/or any implementation thereof.

In operation 1502, a mixed reality presentation system may determine a device-specific parameter characterizing an extent of a field of view of an active imaging device. For example, the active imaging device may be configured to capture imagery of an internal view of a body, and the determining of the device-specific parameter may be performed based on data received from the active imaging device. Operation 1502 may be performed in any of the ways described herein.

In operation 1504, the mixed reality presentation system may determine a spatial pose of the active imaging device as the active imaging device captures the imagery of the internal view of the body. Operation 1504 may be performed in any of the ways described herein.

In operation 1506, the mixed reality presentation system may direct a display device to display a shape overlay indicative of the extent of the field of view relative to the body. For instance, the mixed reality presentation system may direct the shape overlay to be displayed together with an external view of the body. In some examples, the directing of the display device to display the shape overlay in operation 1506 may be performed based on the device-specific parameter determined in operation 1502 and the spatial pose of the active imaging device determined in operation 1504. Operation 1506 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

In some examples, any of the systems and/or other components described herein may be implemented by a computing device including one or more processors, storage devices, input/output modules, communication interfaces, buses, infrastructures, and so forth. For instance, storage facility 102 of system 100 may be implemented by a storage device of the computing device, and processing facility 104 of system 100 may be implemented by one or more processors of the computing device. In other examples, the systems and/or other components described herein may be implemented by any suitable non-transitory computer-readable medium storing instructions that, when executed, direct a processor of such a computing device to perform methods and operations described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a mixed reality presentation system comprising:
   a memory storing instructions; and
   a processor communicatively coupled to the memory and configured to execute the instructions to:
   determine, based on data received from an active imaging device configured to capture imagery of an internal view of a patient, a device-specific parameter characterizing an extent of a field of view of the active imaging device,
   determine a spatial pose of the active imaging device as the active imaging device captures the imagery of the internal view of the patient, and
   based on the device-specific parameter and the spatial pose of the active imaging device, direct a display device to display, together with an external view of the patient captured in real-time by a camera located at a vantage point associated with the external view of the patient while the active imaging device is within the patient and capturing the internal view of the patient, a shape overlay indicative of the extent of the field of view relative to the patient.

2. The system of claim 1, wherein the determining of the device-specific parameter comprises:
   accessing, based on initialization data received from the active imaging device and representative of a set of device-specific parameters, the device-specific parameter from the set of device-specific parameters represented in the initialization data; or
   accessing, based on identification data received from the active imaging device, the device-specific parameter from a stored plurality of device-specific parameters associated with a plurality of different imaging devices including the active imaging device.

3. The system of claim 1, wherein the device-specific parameter characterizes the extent of the field of view of the active imaging device by defining an imaging technology employed by the active imaging device.

4. The system of claim 1, wherein the device-specific parameter characterizes the extent of the field of view of the active imaging device by defining at least one parameter selected from the group consisting of: a viewing angle of the field of view relative to the active imaging device, a focal length of an image sensor included within the active imaging device, and an aspect ratio of the image sensor.

5. The system of claim 1, wherein:
   the device-specific parameter characterizes the extent of the field of view of the active imaging device by indicating a viewing angle of the field of view relative to the active imaging device;
   the active imaging device is configured to capture the imagery of the internal view from different viewing angles by employing a distal articulation mechanism; and
   the directing of the display device to display the shape overlay based on the spatial pose of the active imaging device comprises directing the display device to display the shape overlay based on a current articulation of the distal articulation mechanism.

6. The system of claim 1, wherein:
   the active imaging device is configured to provide the captured imagery at different zoom levels supported by the active imaging device; and
   the directing of the display device to display the shape overlay is further based on a current zoom level, from the different zoom levels supported by the active imaging device, at which the active imaging device is providing the captured imagery.

7. The system of claim 1, wherein:
   the processor is further configured to execute the instructions to determine, based on the spatial pose and the device-specific parameter, the extent of the field of view relative to the patient; and
   the directing of the display device to display the shape overlay is further based on the determining of the extent of the field of view relative to the patient.

8. The system of claim 1, further comprising:
   a mixed reality media player device configured to be worn on a head of a user and that implements the mixed reality presentation system;
   a communication interface included within the mixed reality media player device, the communication interface communicatively coupled to the active imaging device and configured to access the data received from the active imaging device;
   a first physical display included within the mixed reality media player device, the first physical display configured to provide a graphical presentation to a first eye of the user when the mixed reality media player device is worn on the head of the user; and
   a second physical display included within the mixed reality media player device, the second physical display configured to provide a graphical presentation to a second eye of the user when the mixed reality media player device is worn on the head of the user;

wherein:

the processor and the memory are included within the mixed reality media player device, and the first and second physical displays included within the mixed reality media player device collectively implement the display device.

9. The system of claim 1, wherein:

the processor is further configured to execute the instructions to determine a spatial relationship between the display device and the active imaging device as the active imaging device captures the imagery of the internal view of the patient, wherein the spatial relationship comprises a position relationship or an orientation relationship between the display device and the active imaging device; and the directing of the display device to display the shape overlay together with the external view of the patient is performed further based on the spatial relationship.

10. The system of claim 1, wherein:

the processor is further configured to execute the instructions to determine a depth, relative to the active imaging device, of an anatomical surface depicted in the imagery captured by the active imaging device of the internal view of the patient; and the shape overlay that is displayed together with the external view of the patient is further indicative of the depth of the anatomical surface.

11. The system of claim 10, wherein:

the depth of the anatomical surface is an average depth of a portion of the anatomical surface included within the field of view; or the depth of the anatomical surface is a depth map representing depth contours of a portion of the anatomical surface included within the field of view.

12. The system of claim 1, wherein:

the device-specific parameter characterizing the extent of the field of view indicates that the active imaging device is a stereoscopic imaging device including:

a first image sensor configured to capture the imagery of the patient from a first vantage point, and a second image sensor configured to capture the imagery of the patient from a second vantage point; and when only the first image sensor is actively providing the imagery for presentation to a user, the directing of the display device to display the shape overlay together with the external view comprises directing the display device to display a shape overlay corresponding to the first image sensor.

13. The system of claim 1, wherein:

the device-specific parameter characterizing the extent of the field of view indicates that the active imaging device is a stereoscopic imaging device including:

a first image sensor configured to capture the imagery of the patient from a first vantage point, and a second image sensor configured to capture the imagery of the patient from a second vantage point; and when both the first and second image sensors are actively providing the imagery for presentation to a user, the directing of the display device to display the shape overlay together with the external view comprises directing the display device to display a shape overlay corresponding to both the first and second image sensors.

14. The system of claim 1, wherein the processor is further configured to execute the instructions to:

determine, based on the data received from the active imaging device, an additional device-specific parameter characterizing an extent of a potential field of view of the active imaging device; and based on the additional device-specific parameter, direct the display device to display, together with the external view of the patient, a potential shape overlay indicative of the extent of the potential field of view of the active imaging device relative to the patient.

15. The system of claim 14, wherein:

the active imaging device is configured to capture the imagery of the internal view by way of one imaging technology at a time from a plurality of imaging technologies supported by the active imaging device;

the field of view corresponds to a first imaging technology in the plurality of imaging technologies; and the potential field of view corresponds to a second imaging technology in the plurality of imaging technologies, the second imaging technology distinct from the first imaging technology.

16. The system of claim 1, wherein the processor is further configured to execute the instructions to:

determine an additional device-specific parameter characterizing an extent of a potential field of view of a non-active imaging device configured to capture imagery of the internal view of the patient; and based on the additional device-specific parameter and the spatial pose of the active imaging device, direct the display device to display, together with the external view of the patient and in place of the shape overlay, a potential shape overlay indicative of the extent of the potential field of view of the non-active imaging device relative to the patient.

17. A method comprising:

determining, by a mixed reality presentation system and based on data received from an active imaging device configured to capture imagery of an internal view of a patient, a device-specific parameter characterizing an extent of a field of view of the active imaging device;

determining, by the mixed reality presentation system, a spatial pose of the active imaging device as the active imaging device captures the imagery of the internal view of the patient; and directing, by the mixed reality presentation system and based on the device-specific parameter and the spatial pose of the active imaging device, a display device to display, together with an external view of the patient captured in real-time by a camera located at a vantage point associated with the external view of the patient while the active imaging device is within the patient and capturing the internal view of the patient, a shape overlay indicative of the extent of the field of view relative to the patient.

18. The method of claim 17, wherein the device-specific parameter characterizes the extent of the field of view of the active imaging device by defining at least one parameter selected from the group consisting of: an imaging technology employed by the active imaging device, a focal length of an image sensor included within the active imaging device, and an aspect ratio of the image sensor.

19. The method of claim 17, wherein the device-specific parameter characterizes the extent of the field of view of the active imaging device by indicating a viewing angle of the field of view relative to the active imaging device.

20. The method of claim 17, further comprising determining, by the mixed reality presentation system, a depth, relative to the active imaging device, of an anatomical surface depicted in the imagery captured by the active imaging device of the internal view of the patient; and wherein the shape overlay that is displayed together with the external view of the patient is further indicative of the depth of the anatomical surface.

21. The method of claim 17, wherein:

the device-specific parameter characterizing the extent of the field of view indicates that the active imaging device is a stereoscopic imaging device including:

a first image sensor configured to capture the imagery of the patient from a first vantage point, and a second image sensor configured to capture the imagery of the patient from a second vantage point; and the directing of the display device to display the shape overlay together with the external view of the patient is further based on which one or both of the first and second image sensors is actively providing the imagery for presentation to a user.

22. The method of claim 17, further comprising:

determining, by the mixed reality presentation system an additional device-specific parameter, the additional device-specific parameter characterizing an extent of a potential field of view, the extent of the potential field of view being of the active imaging device or a non-active imaging device; and directing, by the mixed reality presentation system and based on the additional device-specific parameter, the display device to display, together with the external view of the patient, a potential shape overlay indicative of the extent of the potential field of view relative to the patient.

23. A non-transitory computer-readable medium storing instructions that, when executed, direct a processor of a mixed reality presentation system to:

determine, based on data received from an active imaging device configured to capture imagery of an internal view of a patient, a device-specific parameter characterizing an extent of a field of view of the active imaging device, determine a spatial pose of the active imaging device as the active imaging device captures the imagery of the internal view of the patient, and based on the device-specific parameter and the spatial pose of the active imaging device, direct a display device of the mixed reality presentation system to display, together with an external view of the patient captured in real-time by a camera located at a vantage point associated with the external view of the patient while the active imaging device is within the patient and capturing the internal view of the patient, a shape overlay indicative of the extent of the field of view relative to the patient.

* * * * *